US012035044B2

(12) United States Patent
Stimm et al.

(10) Patent No.: US 12,035,044 B2
(45) Date of Patent: Jul. 9, 2024

(54) METHODS AND APPARATUS FOR RE-STABILIZING VIDEO IN POST-PROCESSING

(71) Applicant: GoPro, Inc., San Mateo, CA (US)

(72) Inventors: Daryl Stimm, Encinitas, CA (US); Andrew Russell, San Francisco, CA (US); Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 253 days.

(21) Appl. No.: 17/449,713

(22) Filed: Oct. 1, 2021

(65) Prior Publication Data

US 2023/0109047 A1 Apr. 6, 2023

(51) Int. Cl.
*H04N 23/68* (2023.01)
*H04N 7/01* (2006.01)
*H04N 23/80* (2023.01)

(52) U.S. Cl.
CPC ......... *H04N 23/683* (2023.01); *H04N 7/0137* (2013.01); *H04N 23/6811* (2023.01); *H04N 23/6812* (2023.01); *H04N 23/80* (2023.01)

(58) Field of Classification Search
CPC .......... H04N 5/23216; H04N 5/23248; H04N 5/2328; H04N 5/2628; H04N 5/02
USPC ........................................................ 396/52
See application file for complete search history.

(56) References Cited

U.S. PATENT DOCUMENTS

| 9,681,111 B1 | 6/2017 | Newman | |
|---|---|---|---|
| 2007/0258707 A1* | 11/2007 | Raskar | H04N 23/68 348/E5.037 |
| 2008/0253685 A1* | 10/2008 | Kuranov | G06T 7/33 382/284 |
| 2015/0341536 A1* | 11/2015 | Huang | H04N 23/80 348/208.2 |
| 2022/0030177 A1 | 1/2022 | Newman | |
| 2023/0144635 A1 | 5/2023 | Newman | |
| 2023/0245688 A1 | 8/2023 | Newman | |
| 2023/0247292 A1 | 8/2023 | Stimm | |

* cited by examiner

*Primary Examiner* — Xi Wang
(74) *Attorney, Agent, or Firm* — Wang Hardoon, P.C.

(57) ABSTRACT

Methods and apparatus for post-processing in-camera stabilized video. Embodiments of the present disclosure reconstruct and re-stabilize an in-camera stabilized video to provide for improved stabilization (e.g., a wider crop, etc.) In-camera sensor data may be stored and used to re-calculate orientation metadata in post-production. In-camera stabilization provides several benefits (e.g., the ability to share stabilized videos from the camera without additional post-processing as well as reduced file sizes of the shared videos). Camera-aware post-processing can reuse portions of the in-camera stabilized videos while providing additional benefits (e.g., the ability to regenerate the original captured videos in post-production and re-stabilize the videos). Camera-aware post-processing can also improve orientation metadata and remove sensor error. The disclosed techniques also enable assisted optical flow-based stabilization using the refined metadata.

20 Claims, 13 Drawing Sheets

METHODS AND APPARATUS FOR RE-STABILIZING VIDEO IN POST-PROCESSING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to storing and processing video content. Specifically, the present disclosure relates to storage, post-processing and stabilization of image and video data.

DESCRIPTION OF RELATED TECHNOLOGY

Image stabilization refers to techniques that reduce blurring and/or jitter. Jitter may be introduced by camera motion during image capture (e.g., due to handshake or vehicle motion, etc.) When successful, image stabilization can produce sharper images and/or smoother, less jittery motion in video. Most techniques for image stabilization rely on mechanical movements, e.g., an external gimble or internal adjustment of the lens or sensor within the camera itself. In contrast, so-called Electronic Image Stabilization (EIS) techniques use image manipulation software to compensate for camera motion.

Existing solutions for Electronic Image Stabilization (EIS) are either in-camera, or off-camera (post-capture, also referred to as "post-processing"). While in-camera stabilization can provide a variety of benefits (e.g., immediate sharing, reduced file sizes), the resulting video quality may be limited by the resources of the camera device. In order to obtain better results, most workflow/techniques are designed for post-processing stabilization which can be performed without time constraints and resource limitations.

Ideally, improved solutions would leverage the benefits of in-camera stabilization, without being limited to in-camera resources.

DETAILED DESCRIPTION

Figure 1:
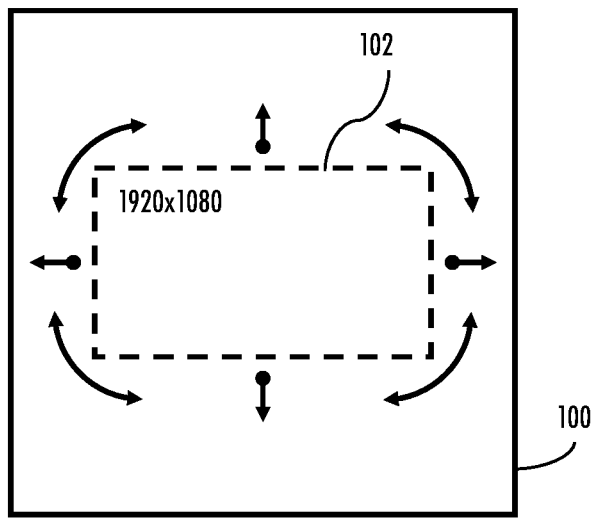
FIG. 1 is a graphical representation of Electronic Image Stabilization (EIS) techniques, useful in explaining various aspects of the present disclosure.
Figure 1:
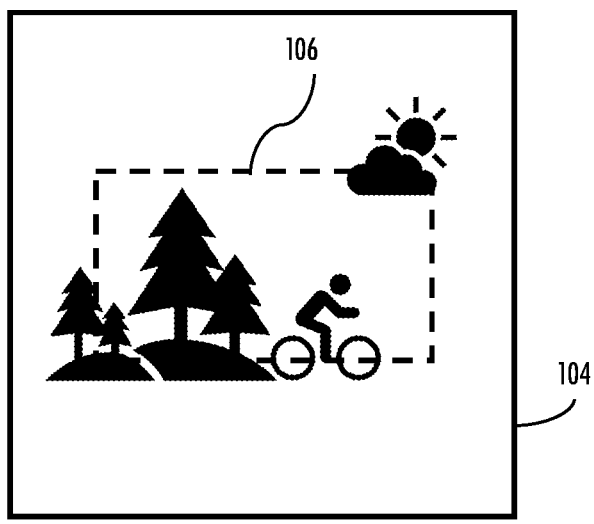
Figure 1:

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Electronic Image Stabilization (EIS): In-Camera Versus Post-Processing

Electronic Image Stabilization (EIS) techniques are generally implemented in-camera (via embedded hardware), or alternatively in post-processing (via video editing software). Over time, in-camera and post-processing EIS solutions have diverged in operation and capability. These differences reflect the most commonly available device resources and usage scenarios. For example, in-camera EIS relies on device sensors and runs on real-time budgets. In-camera EIS is convenient for casual viewing and can be immediately shareable (e.g., via social networks, peer-to-peer connectivity, etc.) In contrast, post-processing EIS techniques are computationally complex and usually used by power users that desire (or require) higher quality stabilization. In many cases, post-processing EIS techniques only process image data (since orientation data is not part of standard audio/visual (A/V) data formats).

Consider a camera or other imaging device that captures a series of images having a field of view. As used herein, the "captured view" refers to the total image data that is available for Electronic Image Stabilization (EIS) manipulation. EIS algorithms generate a "designated view" to create the illusion of stability; the designated view corresponds to a portion of the captured view. A designated view of an image is the visual portion of the image that may be presented on a display and/or used to generate frames of video content. In some cases, the designated view may also be referred to as a "cut-out" of the image, a "cropped portion" of the image, or a "punch-out" of the image.

Notably, the difference between the designated view and the captured field of view defines a "stabilization margin." The designated view may freely pull image data from the stabilization margin. For example, a designated view may be rotated and/or translated with respect to the originally captured view (within the bounds of the stabilization margin). In certain embodiments, the captured view (and likewise the stabilization margin) may change between frames of a video. Digitally zooming (proportionate shrinking or stretching of image content), warping (disproportionate shrinking or stretching of image content), and/or other image content manipulations may also be used to maintain a desired perspective or subject of interest, etc.

As a practical matter, EIS techniques must trade-off between stabilization and wasted data, e.g., the amount of movement that can be stabilized is a function of the amount of cropping that can be performed. Un-stable footage may result in a smaller designated view whereas stable footage may allow for a larger designated view. For example, EIS may determine a size of the designated view (or a maximum viewable size) based on motion estimates and/or predicted trajectories over a capture duration, and then selectively crop the corresponding designated views.

In-camera Electronic Image Stabilization (EIS) (or more broadly, "sensor-based EIS") uses sensor data (e.g., accelerometer and gyroscope) to determine the movement of the capture device. Then, each frame of video is rotated (tilted) and/or translated (panned) to counteract the sensed motion. In-camera EIS greatly reduces apparent motion caused by camera shake and frame-to-frame jitter. As used herein, the term "apparent motion" refers to the illusion of an object's motion caused by the relative motion between the capture device and the object.

For example, as shown in FIG. 1, a large image capture 100 (e.g., 2880 pixels×2880 pixels) may be used to generate a stabilized high-definition (HD) output video frame 102 (e.g., 1920 pixels×1080 pixels). The EIS algorithm may select any contiguous 1920×1080 pixels and may rotate and translate the output frame 102 within the total captured field of view 100. For example, a camera may capture all of scene 104 but only use the narrower field of view of scene 106. After in-camera stabilization, the output frame 108 can be grouped with other frames and encoded into video for transport off-camera. Since video codecs compress similar frames of video using motion estimation between frames, stabilized video results in much better compression (e.g., smaller file sizes, less quantization error, etc.)

Figure 2:
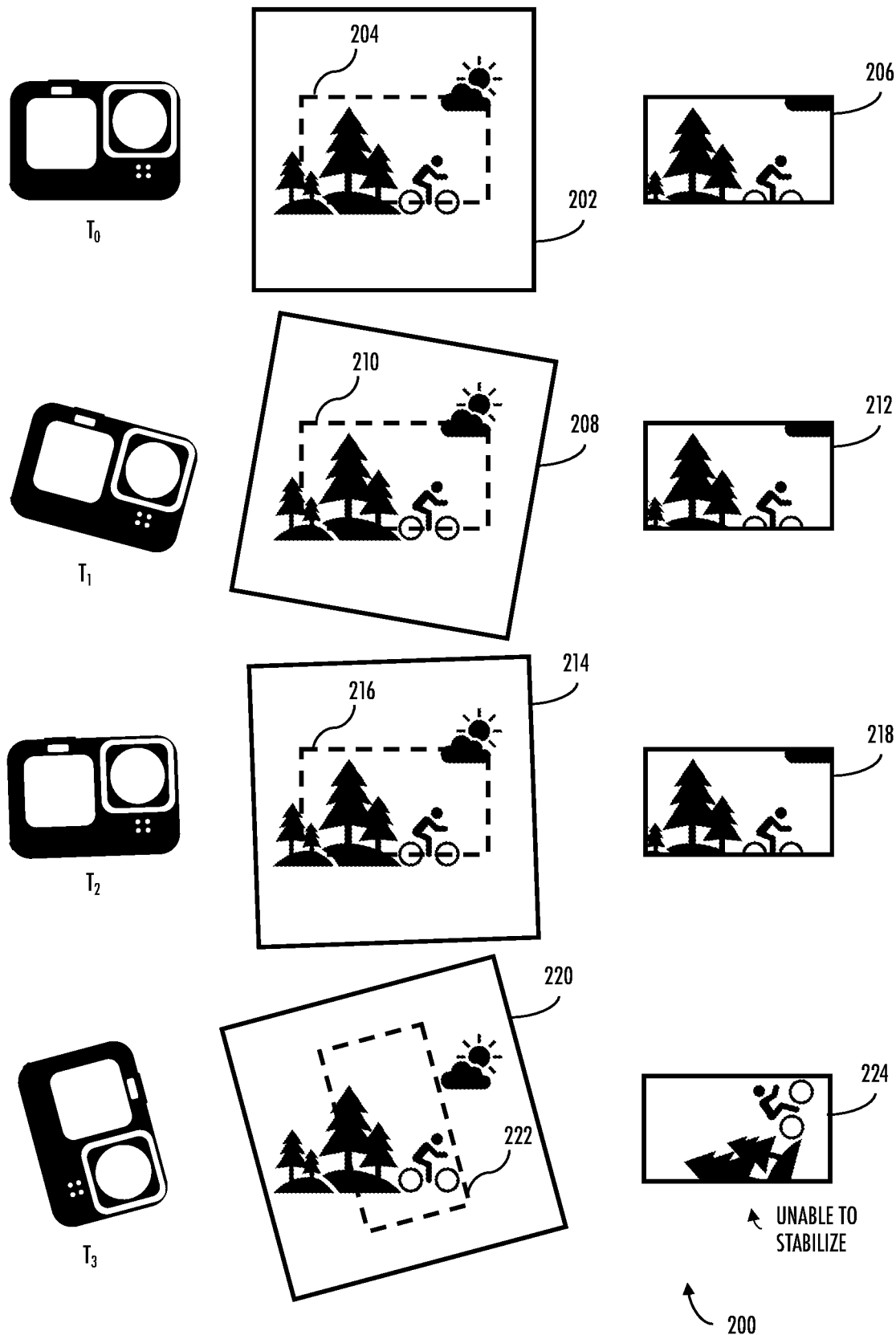
FIG. 2 is a graphical representation of in-camera stabilization and its limitations, useful in explaining various aspects of the present disclosure.

Unfortunately, in-camera stabilization is limited by the camera's onboard resources e.g., the real-time budget of the camera, processing bandwidth, memory buffer space, and battery capacity. Additionally, the camera can only predict future camera movement based on previous movement, etc. To illustrate the effects of in-camera stabilization limitations, FIG. 2 depicts one exemplary in-camera stabilization scenario 200.

At time $T_0$, the camera sensor captures frame 202 and the camera selects capture area 204 for creating stabilized video. Frame 206 is output from the capture; the rest of the captured sensor data may be discarded.

At times $T_1$ and $T_2$, the camera shifts position due to camera shake or motion (e.g., motion of the camera operator). The positional shift may be in any direction including movements about a lateral axis, a longitudinal axis, a vertical axis, or a combination of two or more axes. Shifting may also twist or oscillate about one or more of the forgoing axes. Such twisting about the lateral axis is called pitch, about the longitudinal axis is called roll, and about the vertical axis is called yaw.

As before, the camera sensor captures frames 208, 214 and selects capture areas 210, 216 to maintain a smooth transition. Frames 212, 218 are output from the capture; the rest of the captured sensor data may be discarded.

At time $T_3$, the camera captures frame 220. Unfortunately, however, the camera cannot find a suitable stable frame due to the amount of movement and the limited resource budget for real-time execution of in-camera stabilization. The camera selects capture area 222 as a best guess to maintain a smooth transition (or alternatively turns EIS off). Incorrectly stabilized frame 224 is output from the capture and the rest of the captured sensor data may be discarded.

Unlike in-camera Electronic Image Stabilization (EIS), post-processing EIS stabilizes video that has already been captured. In order to accommodate a variety of different video sources, existing EIS solutions may rely on both sensor data and/or optical flow-based correction that determines the apparent motion of objects by tracking feature points between consecutive frames. In other words, EIS correction in post-processing (after capture) is not a real-time process and can benefit from both image information as well as sensor data.

As a brief aside, image processing (such as feature point detection) is computationally complex and often requires calculating motion vectors for every point of the image/feature. In many cases, feature detection may use subsets of the image domain, often in the form of isolated points, continuous curves or connected regions. Certain types of image content may "confuse" feature detection algorithms, and by extension post-processing EIS; examples of such content may include e.g., tessellated and/or repetitive patterns (e.g., so-called "picket fence" artifacts), low edge content (e.g., clouds), and/or saturated and low-light conditions.

Additionally, images captured with sensors that use an electronic rolling shutter (ERS) expose rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

Both the EIS techniques discussed herein and ERS compensation may be performed to correct for rolling shutter effects from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the motion.

Figure 3:
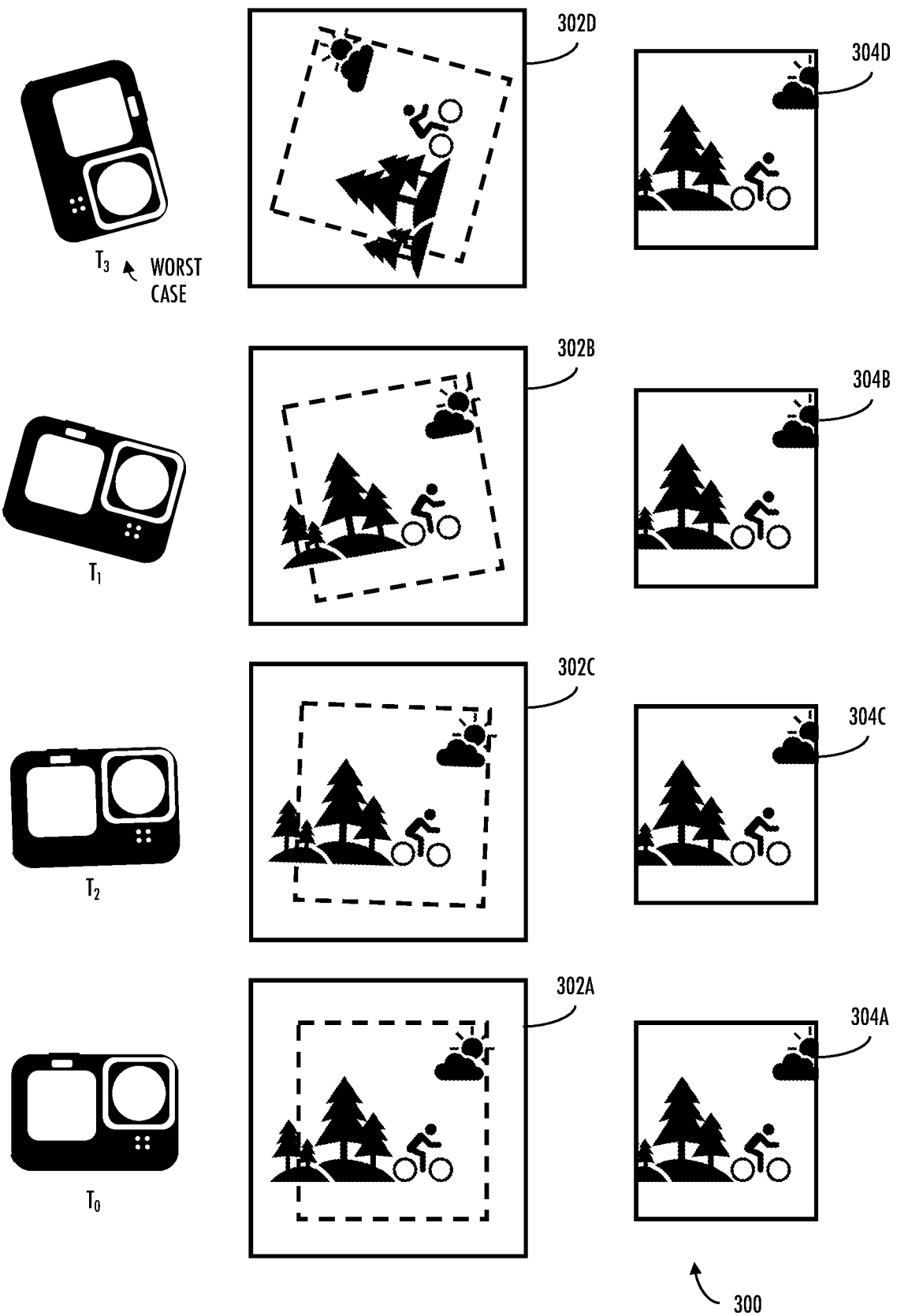
FIG. 3 illustrates an exemplary technique for post-processing stabilization, useful in explaining various aspects of the present disclosure.

Referring now to FIG. 3, one exemplary technique 300 for post-processing Electronic Image Stabilization (EIS) is shown. In this example, a camera has already captured a scene at time $T_0$, time T1, time T2, time T3, with varying degrees of relative movement. Even though the captured images 302A, 302B, 302C, 302D have a time sequence, the post-processing EIS algorithm is not constrained by time and can identify the "worst cases" to compare different extreme angles (e.g., the images may be re-ordered 302D, 302B, 302C, 302A). Foresight/hindsight may also allow post-processing EIS to aggressively select the largest possible designated view (to use smallest stabilization margin necessary). While the foregoing example is described in the context of a "worse case" image, post-processing EIS can handle any prioritization scheme. Examples may include e.g. images with movement beyond a threshold, contiguous movement across sets of images, peak movement for a set of images, etc. Frames 304A, 304B, 304C, and 304D are frames output after processing.

More directly, unlike FIG. 2, the post-processing EIS algorithm is not constrained to a real-time budget (e.g., processing capability, buffer size, and/or battery usage). As used herein, the term "real-time" refers to tasks that must be performed within definitive time constraints; for example, a video camera must capture each frame of video at a specific rate of capture (e.g., 30 frames per second (fps)). As used herein, the term "near real-time" refers to tasks that must be performed within definitive time constraints once started; for example, a smart phone may use near real-time rendering for each frame of video at its specific rate of display, however some queueing time may be allotted prior to display. As used herein, "best-effort" refers to tasks that can be handled with variable bit rates and/or latency. Post-processing EIS is not time sensitive, and thus can use best-effort processing; best-effort processing can be done as a low-priority background task (for even very high complexity tasks), or queued for cloud-based processing, etc.

As described above, existing Electronic Image Stabilization (EIS) techniques have evolved into two clades of techniques. While each technique has distinct benefits and limitations in isolation, combining them together creates unique new problems. For example, EIS provides the illusion of stability by cropping away unused margin; thus, EIS post-processing of in-camera EIS footage would further reduce the size of the designated view (cropping a previously cropped image). Additionally, the in-camera EIS stabilized image data would be stable for all but the most extreme movements—consequently, EIS post-processing would need to perform feature detection over very large search windows for the entire (mostly stable) video clip. This is inefficient and likely would introduce many more errors (e.g., picket fence and cloud artifacts). To these ends, new techniques are needed for re-stabilizing previously stabilized video.

Exemplary Camera-Aware Electronic Image Stabilization (EIS)

Various aspects of the present disclosure are directed to a system and method for camera-aware post-processing of in-camera stabilized video. Embodiments of the present disclosure reconstruct and/or re-stabilize the in-camera stabilized video (where desired) during post-processing. In one exemplary embodiment, the camera-aware post-processing Electronic Image Stabilization (EIS) leverages in-camera stabilization metadata to improve results and/or reduce processing complexity. For example, in-camera stabilization metadata can be used to identify problematic frames and assist optical flow-based motion estimation; additionally, such metadata may be used to refine, remove, and/or reduce sensor error. Notably, the benefits of in-camera stabilization are also preserved, e.g., the in-camera stabilized videos can be efficiently encoded for transfer off-camera and immediately shared/viewed.

In one exemplary embodiment, a camera may capture and store both a designated view of captured image data (a video track) as well as the stabilization margin (e.g., the rest of the captured image data). The stabilization margin may be stored as RAW capture data, as a full image, or as a cropped image (e.g., with the designated view removed, nulled, decimated, or otherwise heavily compressed). Sensor data (e.g., accelerometer and/or gyroscope data) may be captured and stored with the image/video data for later use in camera-aware post-processing. The orientation information derived from the sensor data may be saved as a separate metadata track or alongside the video track. In some embodiments, the in-camera stabilized video track may be shared immediately from the camera; subsequently thereafter, the stabilization margin and orientation metadata can be provided to an camera-aware post-processor so the previously stabilized video may be more aggressively re-stabilized.

In another exemplary embodiment, a camera-aware Electronic Image Stabilization (EIS) post-processing apparatus may use in-camera stabilization metadata such as Image Orientation (IORI), Camera Orientation (CORI), gravity vector (GRAV), gyroscope (gyro), accelerometer readings, and/or warping or rotation values/matrices to reverse the stabilization performed in-camera. Specifically, the post-processing apparatus can retrieve a stabilization margin stored as another video track (or sidecar). The post-processing apparatus may then reconstruct a set of previously stabilized images from the video track and the margin track by combining the designated view with the stabilization margin.

As previously alluded to, the in-camera EIS footage (designated view) may be compressed (via codec) for delivery off-camera and immediately shared; the stabilization margin may be obtained separately via e.g., SD card or similar removable media. As a practical matter, the codec compression may perform motion estimation and/or introduce lossy compression artifacts at the boundary of the designated view which would not be similarly present in the stabilization margin. Consequently, in some variants, blending, blurring, and/or image correction techniques may be used to reduce or correct image artifacts along the border of the designated view (introduced by codec compression) in the reconstructed set of previously stabilized images during subsequent camera-aware post-processing.

As a brief aside, Image Orientation (IORI) and Camera Orientation (CORI) may be represented in a variety of different data structures (e.g., quaternions, Euler angles, etc.) Euler angles are the angles of orientation or rotation of a three-dimensional coordinate frame. In contrast, quaternions are a four-dimensional vector generally represented in the form a +bi+cj+dk where: a, b, c, d are real numbers; and i, j, k are the basic quaternions that satisfy $i^2=j^2=k_2=ijk=-1$. Points on the unit quaternion can represent (or "map") all orientations or rotations in three-dimensional space. Therefore, Euler angles and quaternions may be converted to one another. Quaternion calculations can be more efficiently implemented in software to perform rotation and translation operations on image data (compared to analogous operations with Euler angles); thus, quaternions are often used to perform EIS manipulations (e.g., pan and tilt using matrix operations). As but one such example, the IORI quaternion may be relative to CORI quaternion—IORI represents an image orientation as a vector relative to the camera's orientation. Additionally, the additional dimensionality of quaternions can prevent/correct certain types of errors/degenerate rotations (e.g., gimble lock.) While discussed with reference to quaternions, artisans of ordinary skill in the related art will readily appreciate that the orientation may be expressed in a variety of systems.

In one specific optimization, camera-aware post-processing apparatus may directly leverage sensor metadata and hindsight/foresight to recover image data from the stabilization margin without using computationally expensive optical flow-based Electronic Image Stabilization (EIS). For example, the camera-aware post-processing may use low pass filtering and/or smoothing on Image Orientation (IORI) and Camera Orientation (CORI) data. CORI/IORI data may be used to determine a smoothed orientation from a captured orientation according to the following pseudocode:

```
capturedOrientation[t] = CORI[t] - IORI[t];
smoothedOrientation[t] = lowPassSmooth(capturedOrientation[t+N]...
capturedOrientation[t-M]);
// Where t is a frame, and
// N and M define a smoothing window before/after t.
```

In other implementations, the camera-aware post-processing apparatus may leverage the previously captured/calculated in-camera sensor data and/or orientation changes for frames that were successfully stabilized using in-camera EIS. In some variants, the "worst case" frames may be explicitly identified for the camera-aware post-processor. Focusing the camera-aware post-processing apparatus on the worst-case frames (or any other subset of frames), can greatly reduce post-processing time compared to analysis of the video in its entirety. As a related benefit, the camera-aware post-processing apparatus may also quickly determine a more aggressive designated view size by examining only the worst-case frames. In other words, the camera-aware post-processing apparatus can limit optical flow-based EIS to the frames where it provides a tangible benefit over in-camera EIS.

In some variants, the frames of interest are explicitly flagged (e.g., where in-camera EIS failed to successfully stabilize a frame, a frame that is particularly good, etc.) In other variants, frames of interest may be determined based on the metadata associated with the in-camera stabilization e.g., image orientation (IORI) and camera orientation (CORI). For example, the IORI should mirror, or otherwise counteract, CORI within a threshold tolerance. Significant deviations in IORI, relative to CORI, may indicate problematic frames; similarly small alignment deviations may indicate good frames. For a 2880×2880 capture/1920×1080 display ratio, the CORI and IORI have nearly a 20% threshold tolerance. Artisans of ordinary skill in the related arts will readily appreciate that other implementations will provide a greater (or lesser) degree of tolerance.

In some cases, the frames of interest may be selected for the video clip or capture duration. In other cases, the frames of interest may be localized to a set number of frames, or a subset of the capture duration. In "time window" implementations, the frames of interest may have the largest amount of movement in the time window; this may be particularly useful for live streaming applications. Notably, HTTP Live Streaming (HLS) and MPEG-DASH divide video content into 2 second chunks for delivery over variable network bandwidth. Consequently, the frames of interest for a 2 second window may be useful for designated view selection.

In one exemplary embodiment, camera-aware post-processing can update and/or correct CORI, IORI, and GRAV values. In some cases, the camera-aware post-processor can improve and/or correct accelerometer, gyroscope, and/or optical flow values by deriving improved information from sets of sensor data. For example, optical flow may be determined by tracking feature points between consecutive frames i.e., a discrete value for each frame. Optical flow may be expressed as a vector that can be used to interpolate/extrapolate the motion of objects between/outside consecutive frames of a sequence of frames. Some variants may calculate a running average of sampled data to provide temporal averaging. Similarly, a set of data points may be fitted with N-order polynomials to interpolate/extrapolate behavior over a continuous range. Intermediate accelerometer and gyroscope estimates that correspond more precisely to the frame capture time may allow for better calculation of camera and image orientation (CORI and IORI) estimates.

As previously noted, the camera-aware post-processor has the benefit of hindsight (look back) and foresight (look ahead); in many cases, this may allow the camera-aware post-processor to make more aggressive decisions. As but one such example, the camera-aware post-processor can maximize the designated view by only using the stabilization margin necessary to account for known motion. As another example, the camera-aware post-processor can smooth motion into/out-of perturbations over longer intervals; this can reduce the need for sudden corrections. As a related benefit, minimizing abrupt image motion can reduce high frequency motion coefficients and enable better encoding/decoding efficiencies.

Furthermore, Dynamic Time Warping (DTW) is a technique that finds matches between two temporal sequences that update at varying speeds. DTW may use interpolation, extrapolation, and/or fitting techniques to find similarities between multiple time series (sensor readings over time) to find a warping path and related warping function. Use of DTW functionality at the media/playback time of the frame may offer a better estimation of movement than merely using the most recently obtained sensor values (previously used during in-camera EIS). As but one such example, optical flow and camera positioning may be used to align GYRO, ACCL data with CORI/IORI. In some variants, this estimation may also be combined later encoder/decoder metrics (e.g., motion vectors between blocks in the encoded video file). Notably, such metrics are unavailable to the camera at capture time.

Moreover, optical flow data may be used to align sensor data (e.g., gyroscope, accelerometer, etc.) with a frame of captured video data. Alignment may include analyzing motion vectors generated by optical flow. In one embodiment, a track of sensor data may be synthesized from the frames of captured video data (e.g., a synthesized gyro track), and compared with the actual track of sensor data (e.g., a sensed gyro track) to obtain an offset. The determined offset may be used to calculate updated alignment information (CORI/IORI). In some variants, the alignment process can be performed over the first few frames, and used for the subsequent duration of the captured footage.

In one exemplary embodiment, optical flow and CORI/IORI are obtained for certain distinctive regions of a video (a few frames that have activity/inactivity according to minimum/maximum thresholds). The optical flow and CORI/IORI data are aligned in time to determine a time offset; this time offset can be used for assigning timestamps to captured sensor data (ACCL, GYRO, etc.) to other regions of the video. Thereafter, sensor data and/or orientation information can be extended to other frames using spherical linear interpolation ("slerp") between quaternions. For example, a GYRO orientation and CORI for other frames can be calculated by slerping between the two closest GYRO samples to the CORI timestamp/frame.

Various other aspects of system operation are discussed in greater detail hereinafter.

Techniques for Processing and Storing Image/Video Data

In order to coordinate between the in-camera Electronic Image Stabilization (EIS) algorithm and the subsequent camera-aware post-processing, the sampled sensor data, derived data, designated view, and stabilization margin may be transferred as one or more data structures. Optimized data structures may offer additional efficiencies and/or improve subsequent operation.

As used herein, the terms "sensor data" and "sampled sensor data" and related lexical variants refer to data that is sensed/measured (or sampled) by the in-camera sensors. For example, the camera may include a 3-axis accelerometer, a 3-axis gyroscope, and/or a magnetometer. Similarly, the camera may include a global positioning system (GPS) unit that obtains satellite signaling and/or cellular data.

As used herein, the terms "derived data", "derived sensor data", and similar lexical variants refer to data that is derived, calculated, determined, or otherwise inferred based on the sensor data. As but one such example, a gravity vector may be derived by isolating the effects of gravity from the sampled accelerometer data based on the sampled gyroscope data. Camera Orientation (CORI) and Image Orientation (IORI) may also be derived from the accelerometer and gyroscope on the camera. GPS signaling and data can be used to calculate latitude, longitude, altitude, 2D ground speed, 3D speed, etc.

Artisans of ordinary skill in the related arts will readily appreciate that different types of data may be stored and/or processed differently. For example, sensor data may be treated as discrete data points; in contrast, derived data may be represented as either discrete values and/or converted to continuous waveforms. Discrete data may be especially useful for simple calculations and/or to robustly detect/correct for errors. Continuous waveforms are more complex, but can be extended to infer real-world behavior. In some cases, continuous waveforms may also allow for interpolation/extrapolation of data.

Figure 4:
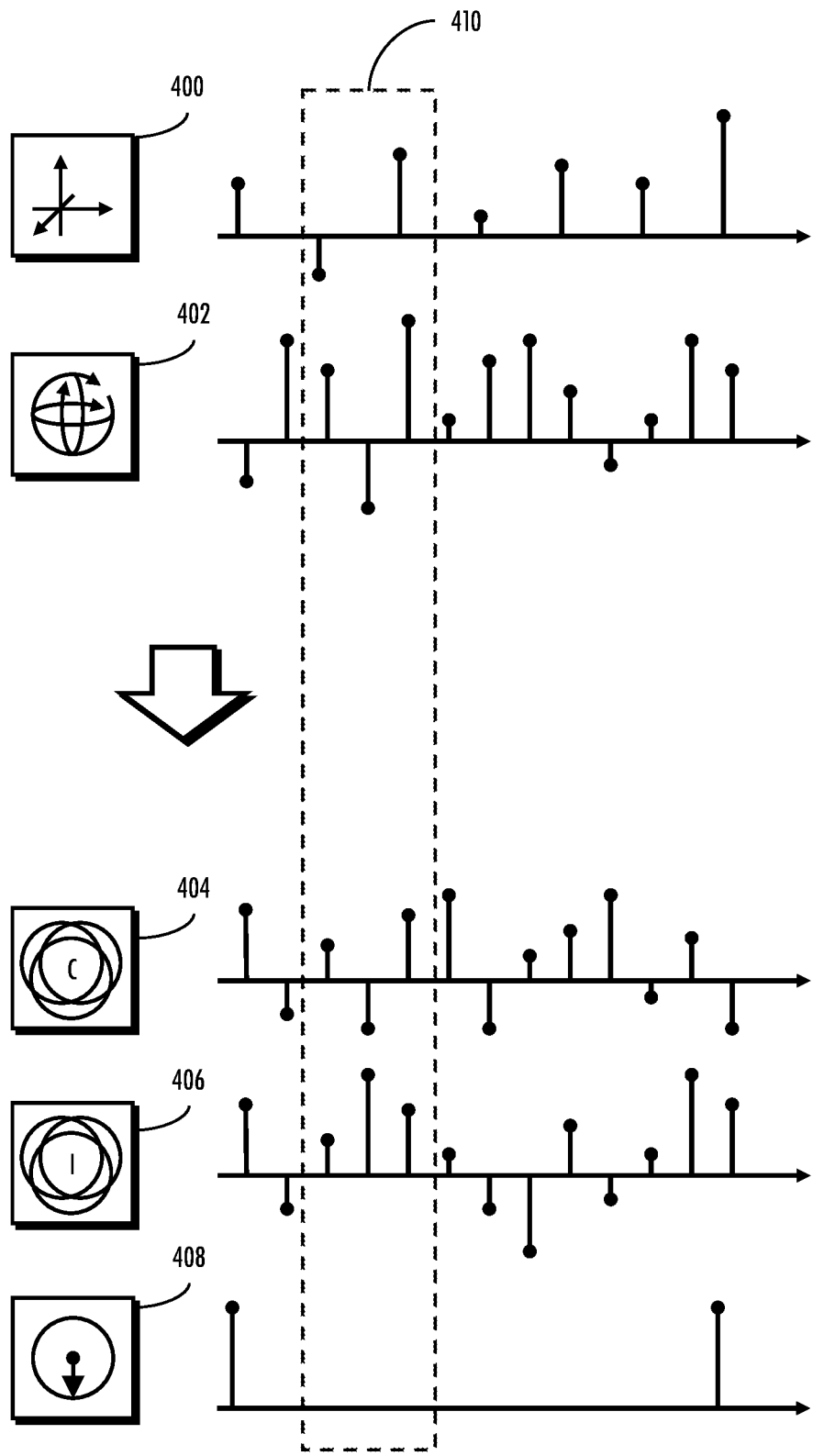
FIG. 4 illustrates sample sensor data and derived sensor data, useful in explaining various aspects of the present disclosure.

FIG. 4 illustrates sensor data and derived data useful in explaining various aspects of the present disclosure. Sensor data may update at different frequencies. For example, accelerometer data 400 may update at rate of 200 Hertz (Hz) or 200 updates/second. Gyroscope data 402 may update at a rate of 400 Hz. In some embodiments (including the illustrated embodiment), a gravity vector may also be updated relatively infrequently, e.g., 10 Hz. These sensor measurements may be synchronous, in-phase, asynchronous, and/or out-of-phase with one another and/or other camera timing (e.g., the frame rate of capture).

As a practical matter, different types of data are needed at varying rates; for instance, optical flow data may only be needed at the frame rate of the video; in contrast, sensor data may be measured at very high speeds to correct for camera/image orientation. In one embodiment, motion may be estimated based on sensor data and stored as quaternions (Camera Orientation (CORI), Image Orientation (IORI)). Each frame of image data may be associated with an updated CORI 404, IORI 406, and Gravity vector (GRAV) 408.

As previously alluded to, in-camera derived data (e.g., CORI and IORI quaternions) may be calculated using the available camera bandwidth and its last known sensor data (e.g., accelerometer/gyroscope samples). In other words, the camera can only estimate (and correct-for) known historic behavior. Additionally, since the camera must prioritize its real-time tasks, in-camera EIS may be de-prioritized or run at best-effort. As a practical matter, the derived data provided by the in-camera EIS may only represent instantaneous behavior and/or may have gaps in data. For example, as shown in FIG. 4, a sudden translation and rotation event 410 may be "flagged" (discussed in greater detail hereinafter) for camera-aware post-processing; the sensor data (accelerometer and gyroscope samples) may need larger error tolerances/correction and/or the derived data (CORI and IORI) may benefit from look back and/or look ahead as well as higher complexity interpolation/extrapolation techniques.

Figure 5A:
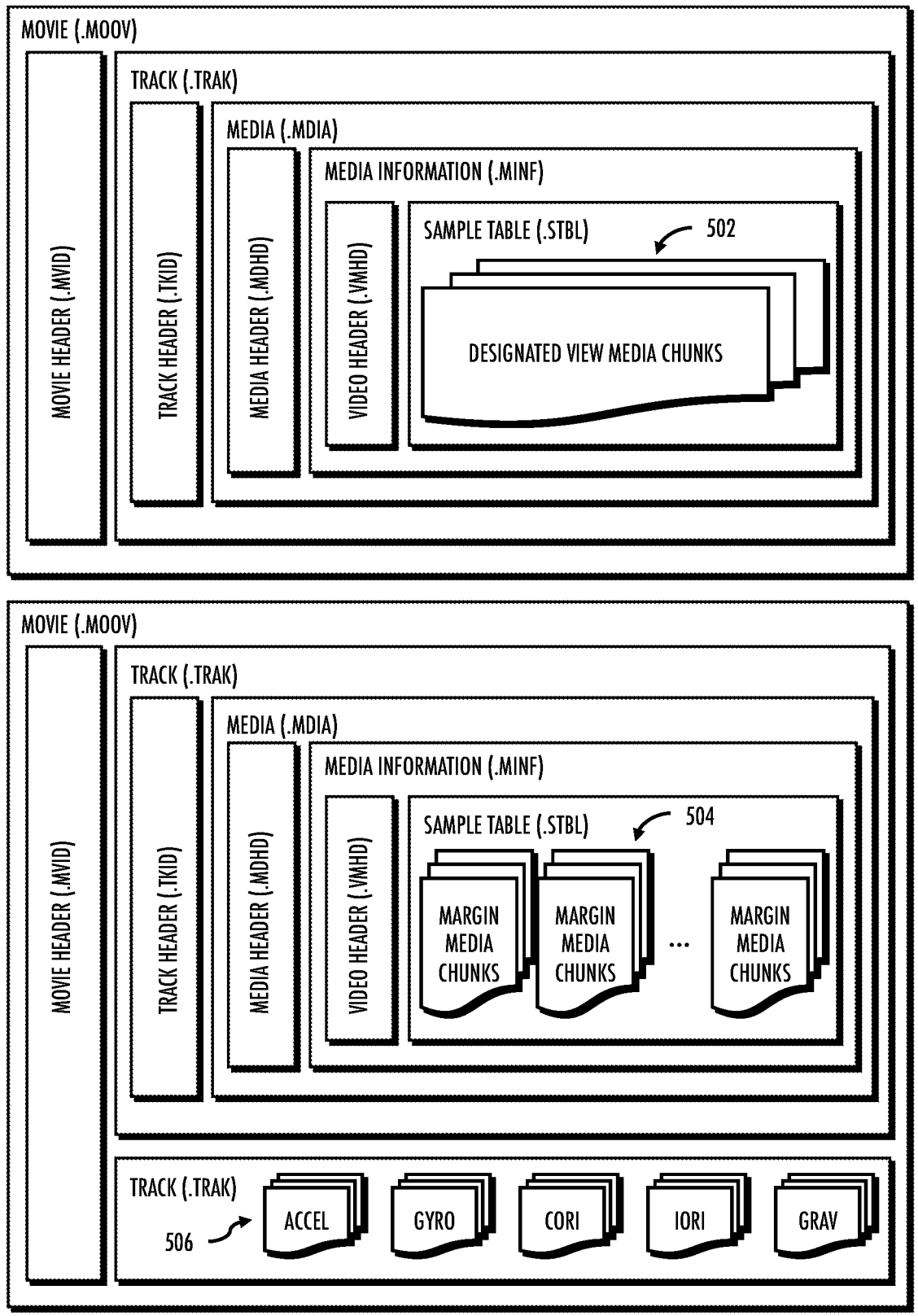
FIGS. 5A-5C provide graphical illustrations of exemplary MPEG-4 file formats, useful in explaining various aspects of the present disclosure.
Figure 5B:
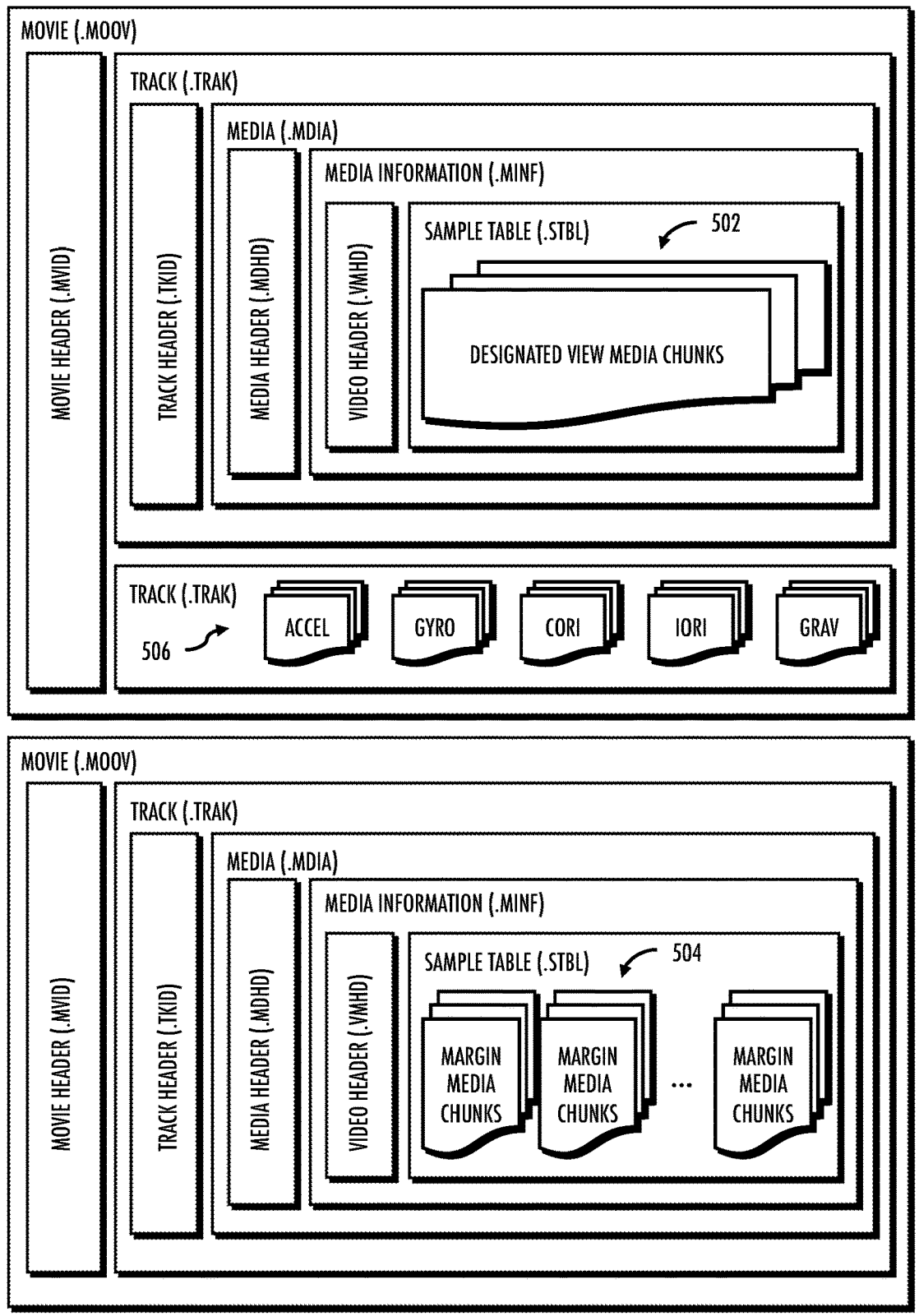
Figure 5C:
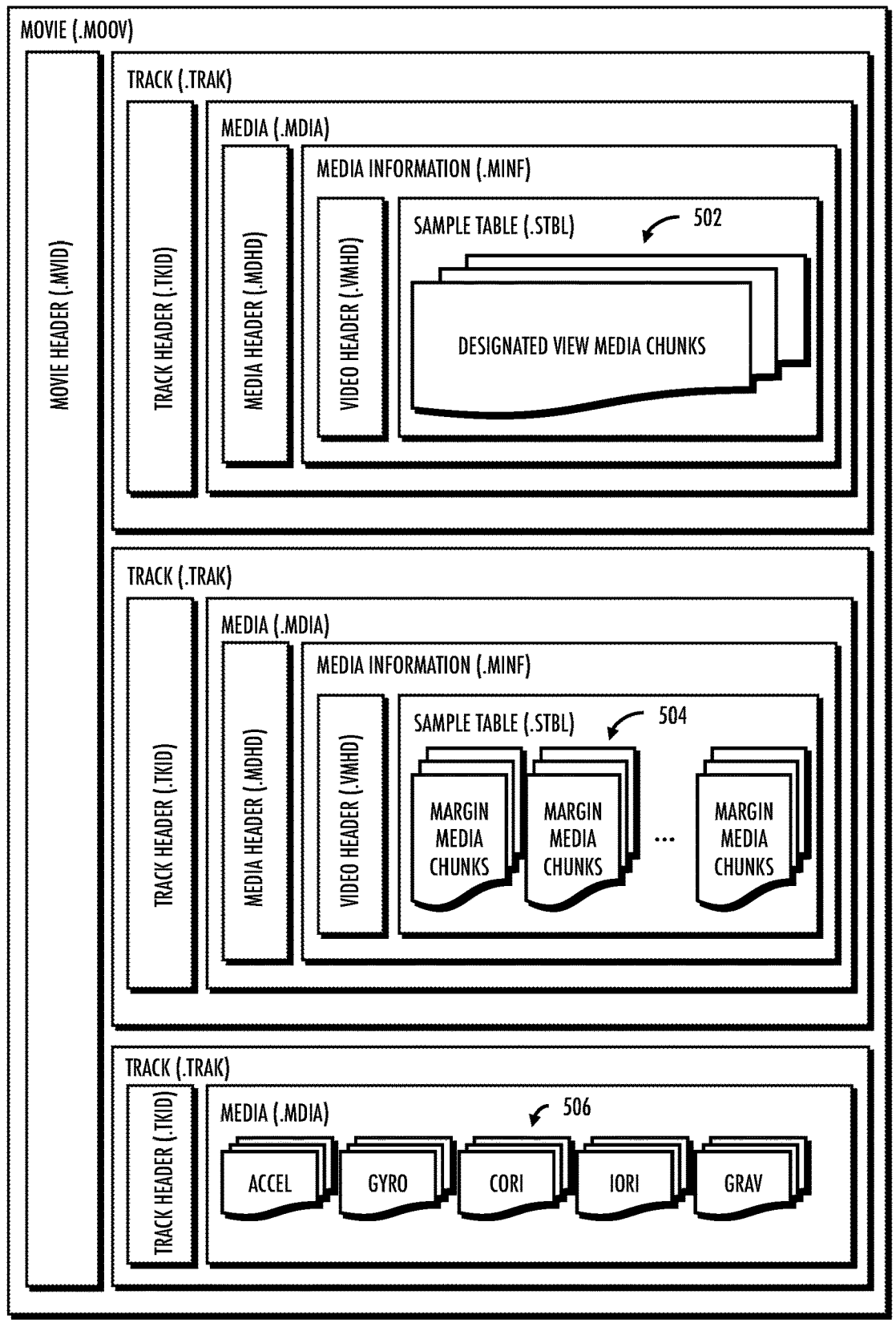

FIGS. 5A-5C depict several exemplary MPEG-4 file formats useful in conjunction with various aspects of the present disclosure.

FIG. 5A depicts a first configuration that stores an in-camera stabilized video (chunks of designated views) 502 separate from all other data, e.g., the orientation metadata 506 and margin media chunks 504 are stored within a separate MPEG-4 container. In some embodiments, the designated view video may be easily accessed for immediate "ready-to-share" applications. Notably, the ready-to-share designated view benefits from higher compression efficiencies and reduced file sizes since the apparent motion of the designated view has been reduced by in-camera EIS.

A separate MPEG-4 may include the margin media chunks 504. As previously alluded to, the camera sensor captures a consistent amount of image data (e.g., 2880×2880) which may be digitally zoomed/warped to generate the designated view (e.g., 1920×1080); notably, the designated view may disproportionately correspond to a larger or smaller area of the total capture data. In some implementations, the margin media chunks 504 may require subsequent digital zooming, warping, smoothing and/or blending to match their corresponding designated view chunks 502. In alternative implementations, the margin media chunks 504 may be pre-modified in-camera using the same digital zoom, warp, and/or other image content manipulations as the corresponding designated view chunks 502.

In some implementations, the stabilization margin track includes the entire captured frame (designated view and stabilization margin). In other implementations, the stabilization margin track includes only the portion of the captured frame not included in the designated view chunks 502. In some implementations, the stabilization margin track may pad or fill the designated view areas with null value, a single (or no) color, or similarly compressible data.

In some embodiments, the camera may also record the orientation metadata 506. The orientation metadata track may include telemetry/sensor data from sensors internal (e.g., accelerometer, gyroscope) and/or external (e.g., external thermometer for ambient temperature, or sensors on a user of the camera such as a heartrate monitor, or on a vehicle (GPS, gyroscope, accelerometer)) to the camera. The metadata may be stored in accordance with a clock inside the camera such that sensor readings may be temporally linked together (e.g., multiplexed) with corresponding video/audio data.

In some embodiments, the orientation information may include the location and/or shape of the cropped portion/video track within the original capture frame/margin track data. This may be used by a device for playback of the video track or camera-aware post-processing (during, e.g., re-stabilization of the video). For example, the orientation information may determine how the margin media chunks 504 are rotated, located, zoomed, warped, and/or otherwise situated relative to the designated view. As a practical matter, the stabilization margin track is primarily intended for subsequent camera-aware post-processing; consequently, in some optimized variants, the stabilization margin track may be optimized for access relative to the designated view (rather than an absolute location of the camera sensor). For example, a first margin chunks may be positioned relative to a corner (e.g., the uppermost right) of the designated view, the second margin chunk may be adjacent-to the first margin chunk, etc. By tiling outwards from the designated view (rather than an absolute sensor location), the camera-aware post-processor may immediately access the margin chunks that are most useful (the least likely to have been cropped out).

Referring now to FIG. 5B, a second configuration is depicted that stores both the designated view chunks 502 and the orientation metadata 506 within the same MPEG-4 container; the margin media chunks 504 may be stored separately in a sidecar file structure. The implementation of FIG. 5B may be useful for camera-aware codecs and/or applications that can make adjustments during replay based on the orientation metadata (horizon leveling, etc.) In some cases, the adjustments may be made dynamically on a frame-by-frame basis. Margin media chunks 504 may be stored separately, and retrieved when necessary (e.g., for camera-aware post-processing.) FIG. 5C depicts a third configuration that stores all media components within the same MPEG-4 container. Such implementations may be suitable for long term archival and/or bulk file transfers.

While the foregoing images depict different multi-track and/or sidecar configurations, artisans of ordinary skill in the related arts given the contents of the present disclosure will readily appreciate that other configurations may be substituted with equal success. For example, other configurations may provide margin and/or orientation metadata in separate sidecars. Still other implementations may use other formats besides MPEG-4. Examples of such formats include, without limitation, MPEG-2, High Efficiency Video Coding (HEVC), Theora, RealVideo RV40, VP9, and AOMedia Video 1 (AV1), etc. Additionally, other video container formats may be used as well including 3GPP, 3GPP2, Advanced Systems Format (ASF), Audio Video Interleave (AVI), DivX Media Format (DMF), MPEG-4, MPEG Transport Stream (MTS), material exchange format (MXF), Ogg, RealMedia Variable Bitrate (RMVB), Video Object (VOB), WebM, etc.

Figure 6:
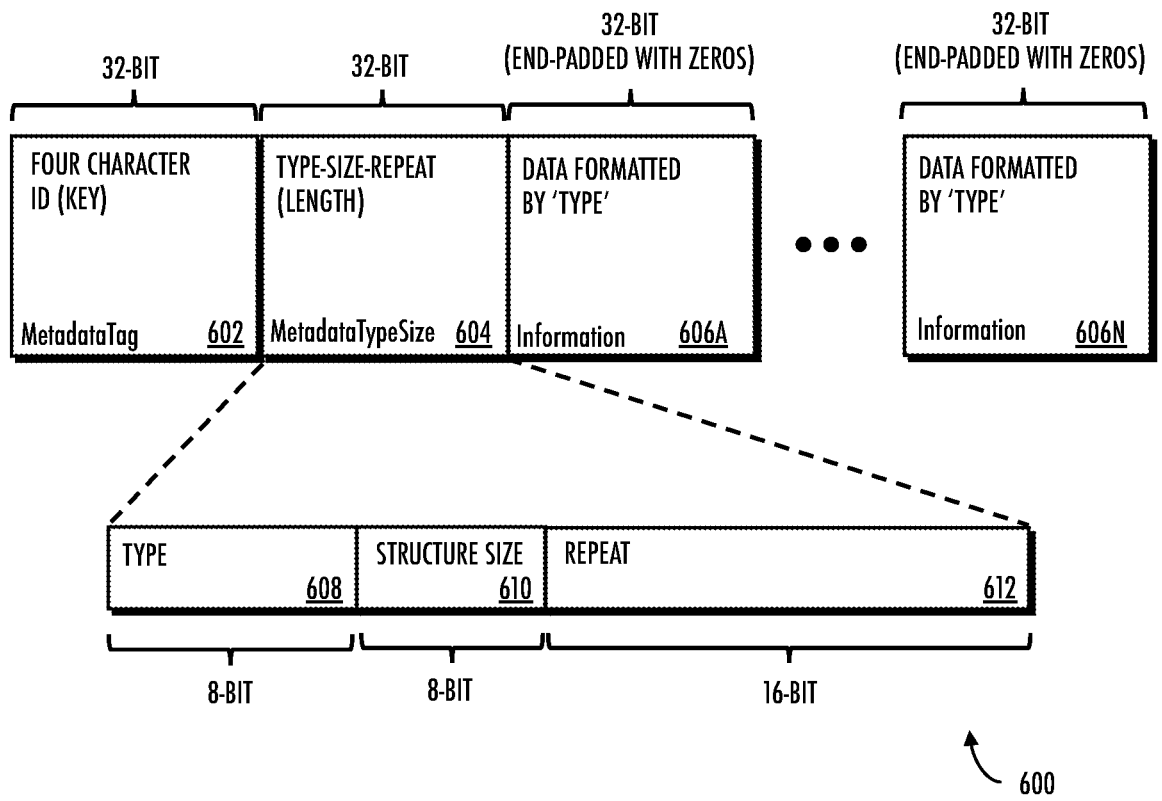
FIG. 6 illustrates an exemplary metadata format for use in a video file or stream, in accordance with various aspects of the present disclosure.

FIG. 6 illustrates an exemplary metadata format for use in a video file or stream. In one exemplary embodiment, the metadata track may be structured using a key, length, value (KLV) data format based on SMPTE 336M, Revision 07M, 2007 and entitled "DATA ENCODING PROTOCOL USING KEY-LENGTH-VALUE" incorporated herein by reference in its entirety. Various other data formats (e.g., JSON or XML data) may be substituted with equal success, given the contents of the present disclosure.

In one specific implementation, the metadata track 600 may include a MetadataTag field 602 (or "key"), a MetadataTypeSize field 604 (or "length") and one or more information blocks 606A-606N (or "values"). In some implementations, the information blocks 606A-606N may be configured as 32-bit aligned values.

The MetadataTag field 602 may include a 32-bit four-character code (fourCC) configured to identify a metadata sensor, and/or type of metadata sensor (e.g., "ACCL", "GYRO", "GRAV"). The use of fourCC tag configuration provides for readability of the file by a human as character codes may be easily discerned when, e.g., viewing the multimedia stream using a hex editor tool.

In some embodiments, the field may also include a 7-bit ASCII key to identify the type of metadata contained in the track. Certain 7-bit ASCII keys may be reserved for particular types of data; examples may include e.g., device names, device identifiers, flags for indicating nested data, scaling factors (to scale sensor data for presentation with specific units), standardized units (e.g., m/s$^2$ for acceleration), display units (e.g., a conversion from rad/s to the more common RPM for engine speed), and/or offset information (e.g., time delay, shift, etc.)

The MetadataTypeSize field 604 may include a 32-bit field included of the following components: MetadataItemType field 608 (8-bit); MetadataItemSize field 610 (8-bit), and MetadataItemRepeat field 612 (16-bit). The MetadataItemType field 608 may include a single character field that may be used to characterize format of the information item the within payload (e.g., the smallest unit of the payload). By way of an illustration, a 32-bit floating value may correspond to type "f", an 8-bit character string may be characterized by type "c" (where a single character is the smallest unit). Similarly, a three component 16-bit accelerometer payload may be characterized by type "s" (where a single acceleration value is a short integer of 2 bytes), and all three components of acceleration (e.g., x, y, and z values) may use the same MetadataItemType in the metadata record.

The MetadataItemSize field 610 may include a binary 8-bit integer indicating a number of bytes per metadata item. By way of an illustration, an 8-bit character string of type "c", may correspond to the MetadataItemSize size of 1. Three 16-bit accelerometer values of type "s" may correspond to the MetadataItemSize of 6 bytes.

The payload MetadataItemRepeat field 612 may include a 2-byte (16 bit) big-endian binary code integer value containing information related to number of items in the payload record (information blocks 606A-606N). The number of items in the payload may correspond to e.g., a number of samples (e.g., gravity vector where individual samples may include a single value), and/or number of samples where a given sample may include multiple values (e.g., 3-components of acceleration may correspond to 3×16-bit values forming one payload item).

Table 1 provides an illustrative set of metadata, useful in conjunction with the various embodiments described herein:

TABLE 1

| FourCC | Property | Approximate Frequency | Units | Comment |
|---|---|---|---|---|
| ACCL | 3-axis accelerometer | 200 | m/s² | Data order (by axis) Z, X, Y |
| GYRO | 3-axis gyroscope | 400 | rad/s | Data order (by axis) Z, X, Y |
| MAGN | magnetometer | 24 | μT | Camera pointing direction |
| CORI | Camera ORIentation | frame rate | n/a | Quaternions for the camera orientation since capture start |
| IORI | Image ORIentation | frame rate | n/a | Quaternions for the image orientation relative to the camera body |
| GRAV | GRAvity Vector | frame rate | n/a | Vector for the direction for gravity |

Additional techniques for structured metadata storage may be used consistent with the present disclosure, the foregoing being purely illustrative. For example, other techniques are described in U.S. Pat. No. 10,431,258 entitled "APPARATUS AND METHODS FOR EMBEDDING METADATA INTO VIDEO STREAM" issued Oct. 1, 2019, and Newman, D., "GPMF Introduction" for the GPMF Parser, retrieved Jul. 7, 2021 from https://github.com/gopro/gpmf-parser/blob/master/does/README.md, each of which is incorporated herein by reference in its entirety. As described therein, additional sensor types and a hierarchical metadata storage approach may be used and/or extended consistent with the principles described herein.

Figure 7:
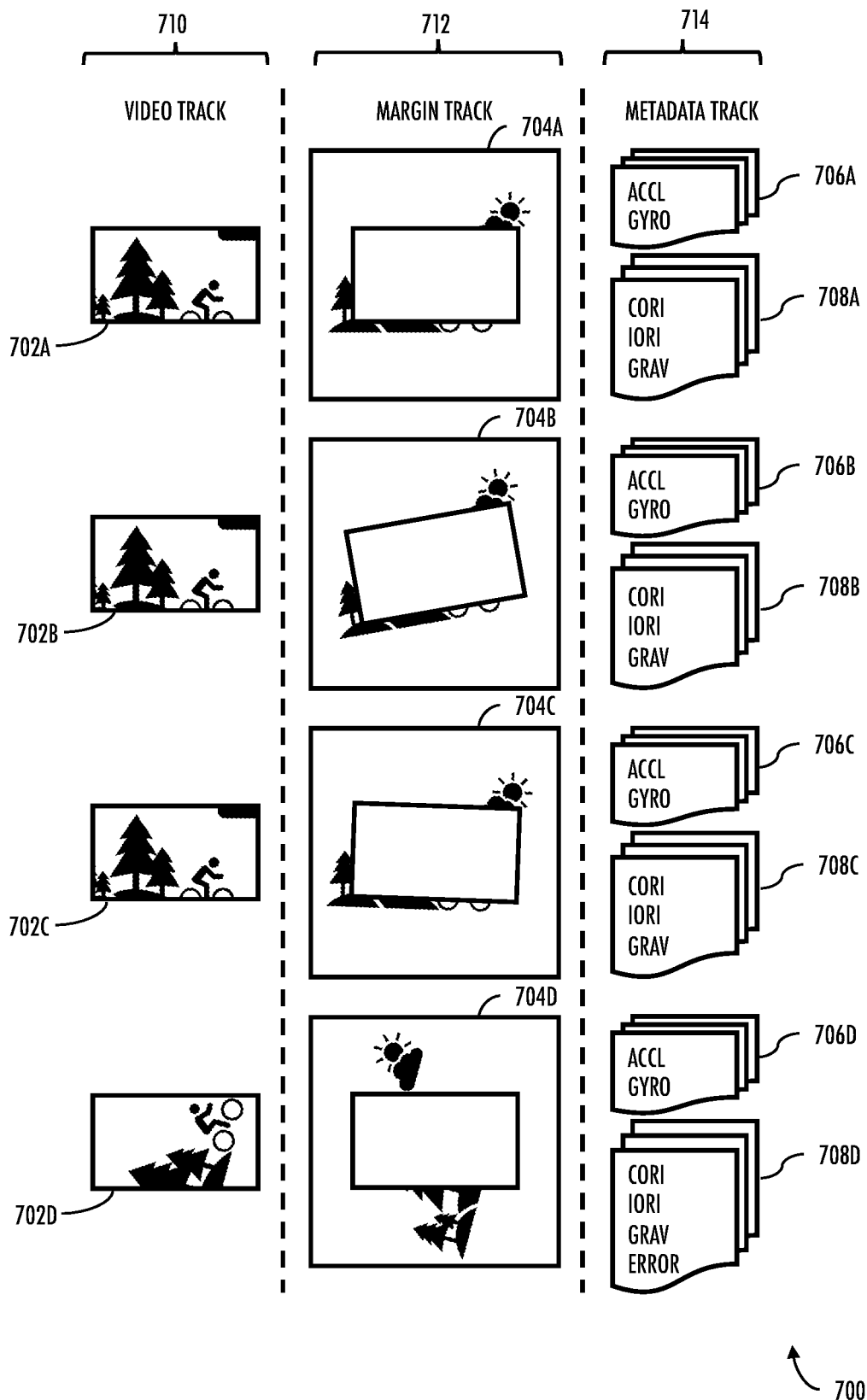
FIG. 7 illustrates an exemplary technique for storing in-camera stabilized video, in accordance with various aspects of the present disclosure.

FIG. 7 illustrates an exemplary technique 700 for storing in-camera stabilized video useful in explaining various aspects of the present disclosure. At the capture time of each frame, the latest sensor data that captures the movement of the camera, e.g., accelerometer and gyroscope data, is obtained. Image stabilization is performed by the camera, which includes generating the image orientation (IORI) of the stabilized image based on other derived sensor data (e.g., CORI and GRAV). The stabilized and cropped frames of video 702A-702D are encoded in a video track 710. The stabilization margins of the frame 704A-704D that was not included in the stabilized and cropped designated view frames are stored in a margin track 712. Sensor input 706A-706D and derived values 708A-708D are stored in the metadata track 714.

In some embodiments, accelerometer readings and gyroscope readings occur more (or less) frequently than the frame rate. For example, the accelerometer and gyroscope values may be added to the metadata track as they are determined (e.g., 200 Hz and 400 Hz are both significantly faster than the display frame rates). In other embodiments, the latest value received from the sensor is used at the capture of the frame and stored in metadata track 714.

In some cases, error flags may be added to the metadata track to identify frames which may benefit from additional correction. For example, as shown in FIG. 7, the amount of motion that occurred when capturing frame 702D exceeded the capabilities of in-camera EIS; as a result, frame 702D is incorrectly oriented relative to frames 702A, 702B, 702C. The metadata 708D corresponding to frame 702D includes an error flag to indicate that in-camera EIS was stopped, failed, or was otherwise disabled. In some variants, the error flag may additionally include information identifying the salient conditions that resulted in erroneous behavior. Examples of such conditions may include, without limitation, environmental conditions (e.g., high or low temperature), battery life or load, processing demands, processing errors, presence/magnitude of movement. In some cases, failure conditions may be indirectly implied; for example, excessive movement may be calculable from CORI, IORI, and/or accelerometer/gyroscope sensor readings.

As previously alluded to, error flags may be used to determine the "worst case" frames during re-stabilization; a camera-aware post-processing apparatus may skip through the video file/video track to quickly/efficiently reach the error (rather than sequentially searching for anomalous behavior using optical processing algorithms). In some cases, the presence and/or temporal location of error flags within a media chunk may be provided in a header. For example, a 2-second window of video may be associated with one or more absolute or relative timestamps of errors. Subsequent camera-aware post-processors can review the header and immediately jump to the timestamp of interest. More generally, any number of techniques for flagging corrective action may be substituted with equal success by artisans of ordinary skill in the related arts.

While the foregoing example is presented in the context of a worst-case analysis, other implementations may enable different gradations of treatment. For example, some applications may allow for more or less quality, e.g., a ready-to-share application may prioritize immediacy over quality, in contrast, media applications may require extreme image quality for e.g., prospective blow-ups, etc. In one such embodiment, header information may include a certainty or uncertainty measure. The camera-aware post-processor can intelligently determine and/or select the subsequent post-processing techniques based on the certainty (uncertainty) measure.

Exemplary Image Data Capture/Processing Architecture

Figure 8:
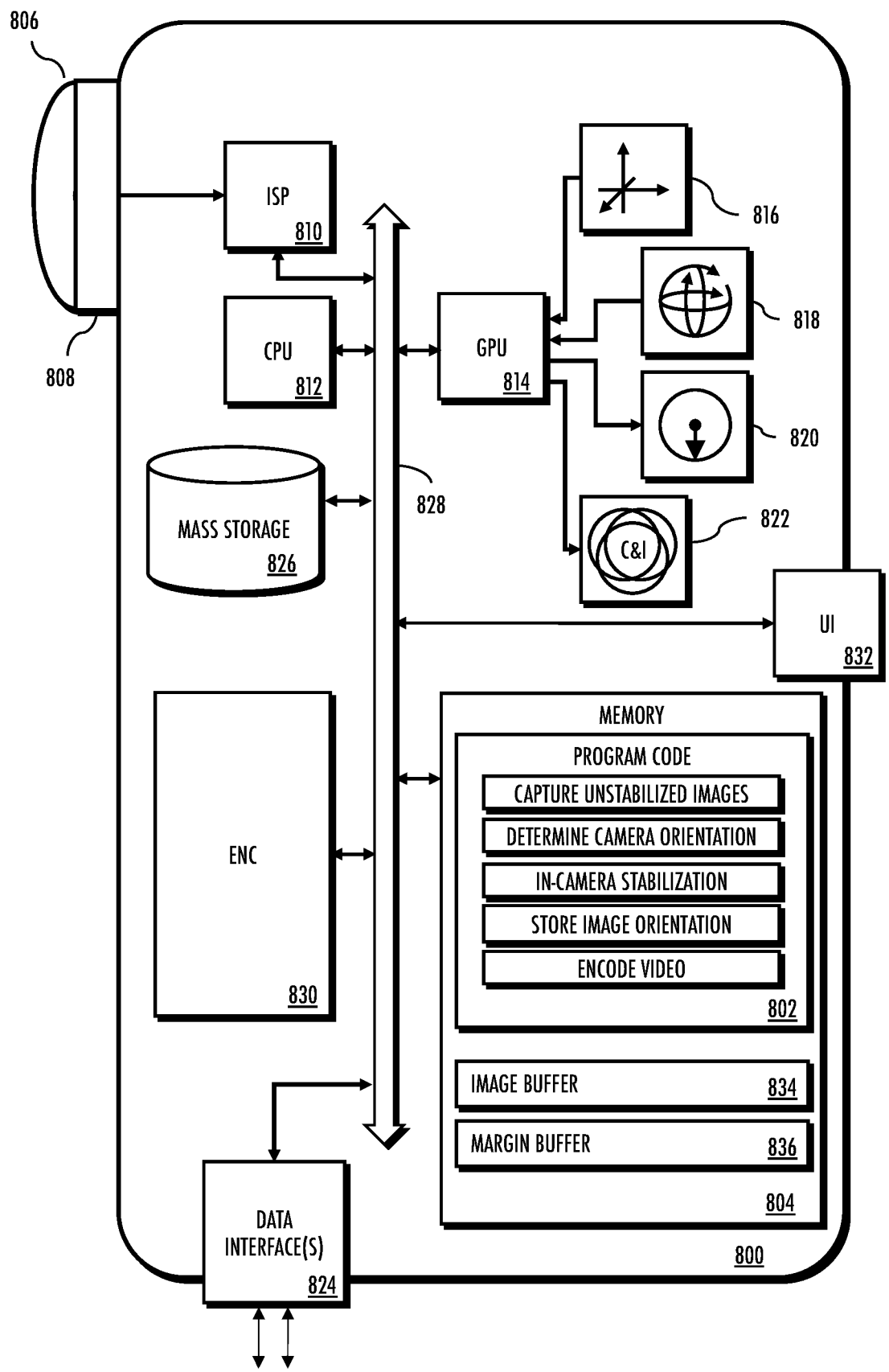
FIG. 8 is a block diagram illustrating components of an example capture and processing apparatus, in accordance with various aspects of the present disclosure.

FIG. 8 is a block diagram illustrating components of an example capture and processing apparatus (camera 800) useful in explaining various aspects of the present disclosure. Camera 800 may read instructions from a computer-readable medium and execute them in one or more processors (or controllers).

Camera 800 can be used to execute instructions (e.g., program code 802 stored in memory 804) for causing the camera 800 to perform any one or more of the methodologies (or processes) described herein. In some implementations, camera 800 operates as a standalone mobile device, or as a connected (e.g., networked) device that connects to one or more networks or computer systems such as the camera-aware post-processing apparatus 900 of FIG. 9, described below. The camera 800 may include, for example, e.g., a mobile "action" camera device, a phone device with camera, or an unmanned aerial vehicle "drone." In another embodiment, the camera 800 may be part of a tablet or laptop computer (e.g., a webcam). Further, while only a single lens 806 and image sensor 808 is illustrated, a plurality of lenses and/or sensors may be used. For instance, in one embodiment, two or more lenses and sensors may capture image data that can be stitched together before (or after) image stabilization.

Camera 800 includes multiple processing units, including an image signal processor 810 used to process the respective image data received from image sensor 808, and a central processing unit (CPU) 812 and/or graphics processing unit (GPU) 814 that may be used to support the camera operations including execution of the aforementioned program code 802 relating to image capture, camera orientation determination (from, e.g., accelerometer 816 and gyroscope 818), in-camera stabilization, image orientation determination and storage (from, e.g., gravity vector information 820 and camera and image orientation 822) and encoding operations (which may include metadata optimizations using data from sensors 816 and 818 and derived sensor data 820 and 822).

The accelerometer 816, gyroscope 818, and other orientation-based sensors (e.g., magnetometer, inertial measurement sensor) may be configured to generate data signals about the orientation, position, and/or movement of camera 800 during operation. In one exemplary embodiment, sensor measurements may be determined when camera 800 is capturing image data. In other embodiments, sensor measurements may be captured any time the camera 800 is "on" or operational (e.g., to detect when to start a capture, minimize capture ramp-up, etc.) In some embodiments, multiple sensor measurements may be captured for each captured frame or image. In some embodiments, the orientation/position information may be determined independent of the image information. In other embodiments, the orientation/position information obtained from sensors may be combined with image data for increased accuracy. In some embodiments, the combination of image data and orientation-based sensor data may exceed the real-time budget of the camera device; in such situations, the data may be stored and incorporated during post-processing on camera 800 or another device (e.g., camera-aware post-processing apparatus 900 of FIG. 9).

In some embodiments, the CPU 812 and GPU 814 are combined with, for example, one or more of a digital signal processor (DSP), encoding hardware 830, a controller, a state machine, one or more application specific integrated circuits (ASICs), as well as one or more radio-frequency integrated circuits (RFICs) (e.g., used to support wireless data communications via the data interface(s) 824 such as via IEEE Std. 802.11, Bluetooth/BLE, IEEE Std. 802.15.4, 3GPP (e.g., 4G/4.5G/5G) NB-IoT, NFC (e.g., ISO 14433) or other air interface, or any combination of the foregoing in a system-on-a-chip (SoC). Similarly, the data interface(s) 824 may include wireline or optical interfaces such as USB, HDMI, DisplayPort, or other such interfaces and supporting protocols.

As shown, the camera 800 also includes a main memory 804 including an image buffer 834 and/or margin buffer 836 for storing data for processing, stabilizing, and encoding. Main memory 804 may also include other storage devices (not shown) such as ROM, SRAM, as well as a mass storage device 826 such as NAND/NOR flash memory, SSD, or even an HDD. The CPU 812, GPU 814, ISP 810, encoding hardware 830, main memory 804, data interface(s) 824, user interface 832, and/or mass storage device 826 may communicate via a bus 828 using any number of data bus protocols such as PCIe. In some implementations, the memory 804 may support non-blocking access; this may ensure that each of the components have unfettered access to memory (e.g., the GPU 814 may access program code 802 while the encoding hardware 830 is accessing the image buffer 834). In other implementations, the memory 804 may support contention resolution logic; contention resolution logic may consider a variety of factors when determining how to mitigate contentious access. Examples of such factors may include e.g., access priority, access time, fairness, load balancing, power consumption, etc.

The image buffer 834 may store images, portions of images, and/or frames of video for inclusion in the "designated view" video content generated by the encoding hardware 830. The image buffer 834 may also cache accesses based on e.g., spatial position/orientation and/or temporal sequence so as to enable look ahead/behind and/or motion prediction algorithms. For example, image buffer 834 may cache look ahead frames for the motion encoding algorithms of the encoding hardware 830. After motion vectors are estimated for an independent frame (I), the cached frames in the image buffer 834 may also be used to generate the differencing information for bi-directional (B) and/or predictive (P) frames.

The margin buffer 836 may store images, portions of images, and/or frames of video that are not included in the "designated view" but which may be otherwise helpful. As but one such example, the encoding hardware 830 may reference margin buffer 836 to determine optimal behavior near the edges of the designated view. Consequently, the margin buffer 836 may also cache accesses based on e.g., spatial position/orientation and/or temporal sequence to enable look ahead/behind and/or motion prediction algorithms. In some embodiments, the margin buffer 836 may also store margin information for subsequent retrieval. In some such variants, the margin buffer 836 may be subdivided into useful segments and encoded via the encoding hardware 830. Notably, margin encoding is not part of the designated view and can be performed on a best-effort or as-needed basis.

Referring back to FIG. 8, the camera 800 may also include a user interface 832 and supporting circuitry and software which may include a display device and driver (e.g., to drive a plasma display panel (PDP), a liquid crystal display (LCD), or capacitive touch screen). The camera 800 may also include input/output devices, e.g., an alphanumeric input device (e.g., touch screen-based keypad or an external input device such as a keyboard, which may be coincident with or part of the user interface 832), and a signal capture/generation device (e.g., a speaker and/or microphone).

Exemplary Camera-Aware Post Processing Architecture

Figure 9:
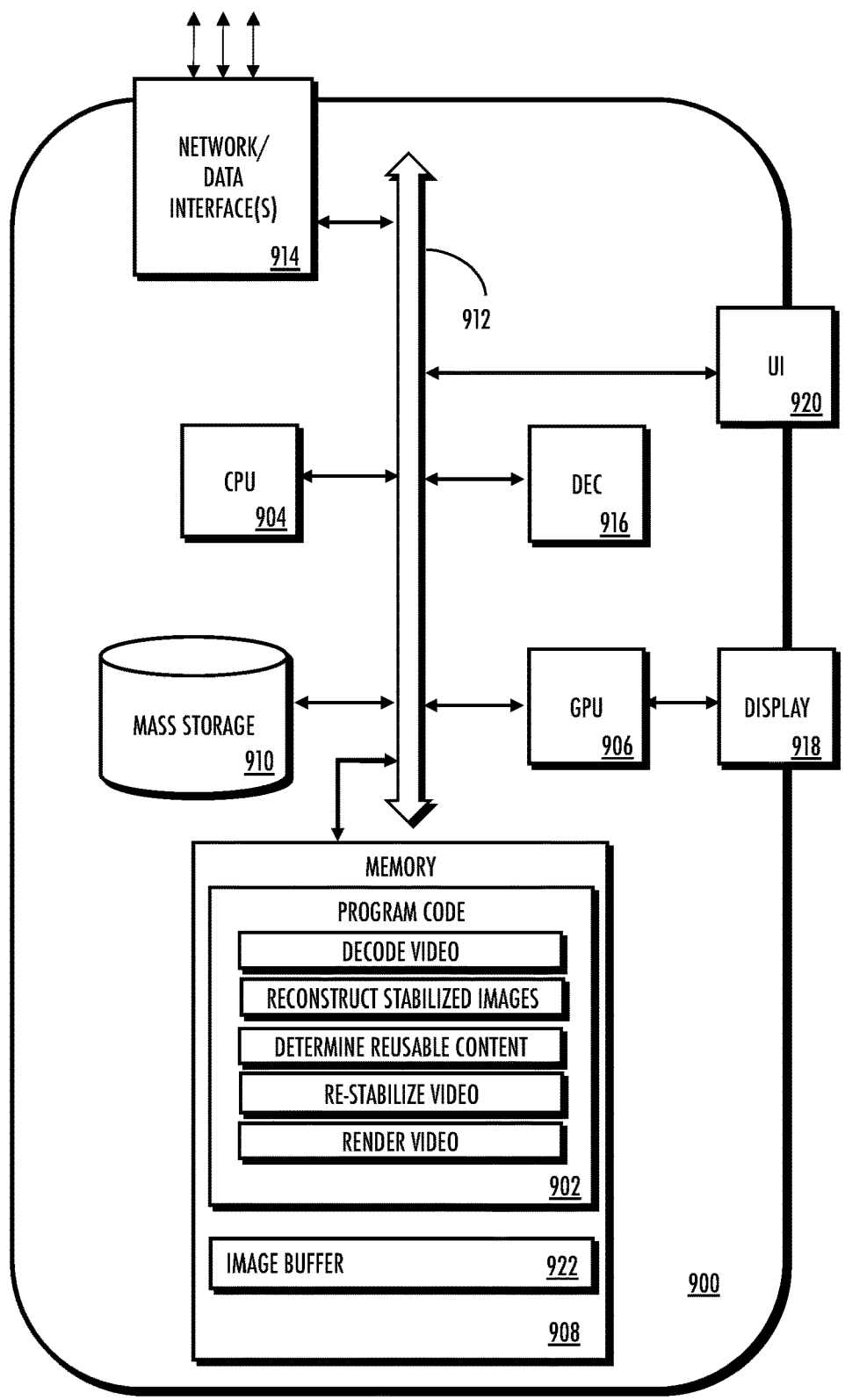
FIG. 9 is a block diagram illustrating components of an example camera-aware post-processing apparatus, in accordance with various aspects of the present disclosure.

FIG. 9 is a block diagram illustrating components of an exemplary camera-aware post-processing apparatus 900 useful with the various aspects of the present disclosure. In one variant, the camera-aware post-processing apparatus 900 is a computing system able to read instructions from a computer-readable medium and execute them in one or more processors (including graphics processors, or controllers). The camera-aware post-processing apparatus 900 may be a high-performance system with dedicated video/graphics processing capability. The camera-aware post-processing apparatus 900 in FIG. 9 may represent an implementation of, for example, camera-aware post-processing and re-stabilization processes described herein.

As used herein, the term "camera-aware" refers to methods, apparatus, and systems that obtain and consider camera metadata during operation. Camera metadata may include captured data (e.g., accelerometer, gyroscope, etc.), derived data (e.g., Camera Orientation (CORI), Image Orientation (IORI), etc.), and/or operational information (e.g., error flags, encoder/decoder metrics, etc.) More broadly, the techniques described herein may be applicable to any machine-aware application including e.g., vehicles (e.g., self-driving cars, drones, etc.) and machine automation (e.g., Internet of Things (IoT)).

The camera-aware post-processing apparatus 900 may include multiple processing units, including a central processing unit (CPU) 904 and/or graphics processing unit (GPU) 906 that may be used to support the camera-aware post-processing operations including execution of program code 902 relating to video decoding, stabilized image reconstruction, determination of reusable content, re-stabilization of video and video rendering operations.

In some implementations, the camera-aware post-processing apparatus 900 operates as a standalone device or a connected (e.g., networked) device that connects to other computer systems (including camera 800 directly such as via a wireless interface), or indirectly via an intermediary such as a cloud server or proxy process). The camera-aware post-processing apparatus 900 may include, for example, a personal computer (PC), a tablet PC, a smartphone, a camera device, a notebook computer, or other device capable of executing instructions or logic (sequential or otherwise) that specify actions to be taken.

The camera-aware post-processing apparatus 900 may also be integrated with the camera 800 (depicted within FIG. 8 above). For example, in some implementations, the camera-aware post-processing apparatus 900 may include an image capture device physically in its form factor or may access the camera via external cabling.

In another embodiment, the camera-aware post-processing apparatus 900 may include a server. In a networked deployment, the camera-aware post-processing apparatus 900 may operate in the capacity of a server or client in a server-client network environment, or as a peer device in a peer-to-peer (or distributed) network environment. For instance, in one implementation, the camera-aware post-processing apparatus 900 may wirelessly interface with a plurality of different capture devices, whether homogeneous or heterogeneous in configuration for post-processing/re-stabilization.

While only a single computer system is illustrated, a plurality of computing systems may operate to jointly execute instructions/program code 902 to perform any one or more of the methodologies discussed herein (e.g., via a distributed software environment). As such, individual processing tasks associated with the program code 902 may be off-loaded or assigned to different devices.

The camera-aware post-processing apparatus 900 may include one or more processing units (CPU 904). As illustrated, the camera-aware post-processing apparatus 900 has a dedicated GPU 906. Alternatively, the CPU 904 may include, for example, an integrated GPU, and digital signal processor (DSP). Processing units may also include a controller, a state machine, one or more application specific integrated circuits (ASICs), one or more radio-frequency integrated circuits (RFICs), or any combination of the foregoing.

The camera-aware post-processing apparatus 900 may also include a main memory 908 with image buffer 922 and/or a mass storage device 910. Each of the CPU 904, GPU 906, memory and mass storage device 910, network/data interface(s) 914, decoding unit 916, and user interface 920 (as well as other components) may communicate via one or more data bus 912 such as those compliant with PCIe or USB standards.

The exemplary image buffer 922 may store images, portions of images, and/or frames of video for reconstructing the originally captured stabilized image sequences during camera-aware post-processing. The processing units may allocate an image buffer for each frame of video and populate the buffer with the corresponding designated view and the stabilized margin chunks (in whole or in part). In some implementations, the entire image is reconstructed; for example, a 2880×2880 image buffer is allocated and populated with the 1920×1080 data and all of the corresponding margin data. In other implementations, only a subset is reconstructed; for instance, a camera motion and/or other capture limitations may reduce the usable resolution to 2400×2400; thus, only 2400×2400 image buffers for each frame are needed. In some implementations the image buffer 922 may also cache accesses based e.g., spatial position/orientation and/or temporal sequence so as to enable look ahead/behind and/or motion prediction algorithms. For example, image buffer 922 may cache look ahead frames for the optical flow algorithms of the camera-aware post-processing. Still other variations may be readily appreciated by artisans of ordinary skill in the related arts, given the contents of the present disclosure.

In some implementations, the camera-aware post-processing apparatus 900 may include a ROM, SRAM or other static memory, a display driver (e.g., to drive a display device 918 such as a plasma display panel (PDP), a liquid crystal display (LCD), capacitive or resistive touch screen input and display device, or a projector). The camera-aware post-processing apparatus 900 may also include input/output devices via user interface 920, e.g., an alphanumeric input device (e.g., touch screen-based keypad or an external input device such as a keyboard), a dimensional (e.g., 2-D or 3-D) control device (e.g., a touch screen or external input device such as a mouse, a trackball, a joystick, a motion sensor, or other pointing instrument), a signal capture/generation device (e.g., a speaker, camera, and/or microphone), and one or more network/data interface(s) 914 (including e.g., PAN, LAN, WLAN, and MAN interfaces such as BLE, 802.15.4, USB, Wi-Fi, 3GPP (4G/4.5G/5G)), the foregoing components which also are configured to communicate via the bus(es) 912.

Embodiments of the camera-aware post-processing apparatus 900 corresponding to a client device may include a different configuration than an embodiment of the camera-aware post-processing apparatus 900 corresponding to a server. For example, an embodiment corresponding to a server may include larger storage capacity, more memory, and a faster processor/co-processor but may lack other components. An embodiment corresponding to a mobile device may include less mass storage, less memory, and a power efficient (and slower) processor core(s), and different wireless or network interfaces. Moreover, the program code 902 loaded onto the mobile device may be less capable than that of the high-end platform (e.g., PC) illustrated in FIG. 9. However, as noted above, the camera-aware post-processing apparatus 900 does not need to operate on a real-time budget once video capture has completed and may use additional techniques such as looking ahead (or throughout the video) that were not available during capture.

In some embodiments, the instructions including the program code 902 may also reside, completely or at least partially, within the CPU 904 or GPU 906 (e.g., within a processor's cache or program memory) during execution by the camera-aware post-processing apparatus 900. In some cases, the instructions of the program code 902 may be transmitted or received over a network via the network/data interface(s) 914 (e.g., at or before runtime).

While the foregoing examples are presented in the context of program instructions stored in non-transitory computer-readable medium/memory, that are executed by a processor, other implementations of logic may be substituted with equal success by artisans of ordinary skill given the contents of the present disclosure. Examples of such logic may include e.g. application specific integrated circuits (ASICs) that are fabricated from combinatorial (AND, OR, NOR, NAND, XOR, etc.) and/or sequential logic (flip flops, latches, etc.), programable logic arrays, and look-up-table implementations of combinatorial/sequential logic (e.g., programmable logic devices (PLDs) and/or field programmable gate arrays (FPGAs)).

While the computer-readable media (main memory 908, mass storage device 910) are shown in an example embodiment to be single media, the term "computer-readable medium" should be taken to include a single medium or multiple media (e.g., a centralized or distributed database, or associated caches and servers) able to store the program code 902 and/or other types of information. The term "computer-readable medium" shall also be taken to include any medium that is capable of storing program code 902 for execution by the camera-aware post-processing apparatus 900 and that cause the camera-aware post-processing apparatus 900 to perform, for example, one or more of the methodologies disclosed herein.

Methods

Figure 10:
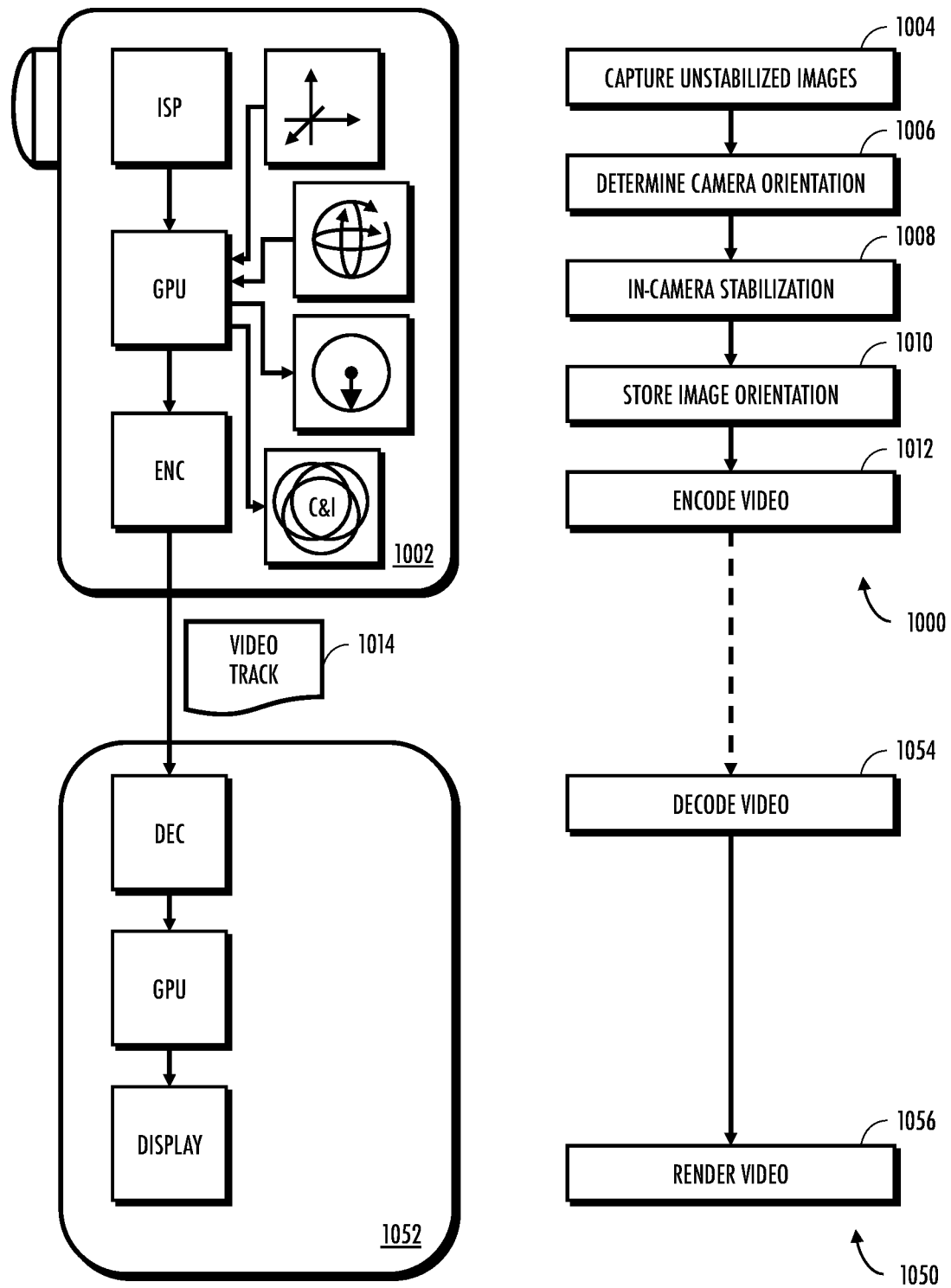
FIG. 10 illustrates logical block diagrams of a generalized method for stabilizing and encoding video and a generalized method for rendering video, in accordance with various aspects of the present disclosure.

FIG. 10 depicts logical block diagrams of a generalized method 1000 for stabilizing and encoding video, and a generalized method 1050 for rendering video. In one exemplary embodiment, the generalized method 1000 may be performed, in whole or part, by an image capture device such as image capture device 1002 (or camera 800 depicted in FIG. 8). In an exemplary embodiment, the generalized method 1050 may be performed, in whole or part, by a video rendering apparatus such as rendering apparatus 1052 (or camera-aware post-processing apparatus 900 depicted in FIG. 9). Moreover, while the present discussion is described in the context of specific entities, the various functionalities may be combined, divided, merged, or otherwise re-apportioned. For instance, portions of image stabilization may occur in various devices.

At step 1004 of the method 1000, image capture device 1002 captures un-stable image content. The un-stable images may be processed by an ISP of the image capture device (e.g., demosaiced, white balance, color correction, exposure, etc.) The image capture device stores the un-stable images in an image buffer for processing. The image buffer may be limited in size, thus, the total number of captured images that can be buffered may be based on the resolution of the captured data, capture rate, etc. In some examples, the image buffer may only be able to store a few seconds of images before it fills up (e.g., 1 second of capture may correspond to 24, 30, 60, etc. images). Typical first-in-first-out (FIFO) implementations of the image buffer may "roll over", e.g., the newly captured content overwrites the oldest contents.

Certain capture devices may capture non-rectangular image content. For example, fisheye lenses may generate hemispherical, semi-hemispherical, and/or hyper-hemispherical image data. While the techniques described herein may be broadly used with any image projection, the most prominent video processing systems assume image projections for use with commodity (rectangular) displays. In some embodiments, the captured image may be projected into a rectangular format for ease of processing. Examples of such rectangular formats may include, without limitation, cubemap, equi-angular cubemap (EAC), equi-rectangular projection (ERP), pyramid format, rotated spherical projection (RSP), etc. In some cases, mapping may require stretching and/or shrinking according to ideal geometric and perspective modeling and mathematics. Mapping can be further described within metadata such that it can be later reversed, and the original image data can be recovered, if necessary.

At step 1006 of the method 1000, the camera orientation is determined. In one exemplary embodiment, the image capture device 1002 obtains sampled sensor data from sensors on the image capture device 1002. The sensors may include an accelerometer, gyroscope, magnetometer, etc. These sensor data may be timestamped at varying rates (e.g., 24 Hz, 200 Hz, 400 Hz, etc.) In some cases, multiple different modalities of sensor readings may be taken during the capture duration. For example, if the image capture device 1002 captures images at 48 images per second, and the accelerometer and gyroscope sensors are read at 200 and 400 Hz respectively, then the image capture device may capture ~5 accelerometer readings and ~10 gyroscope readings during the capture of a single image. The combination of the sampled sensor data can be used to derive translational and/or rotational movements of image capture device 1002 which can be used to stabilize the image. The derived data (e.g., camera orientation (CORI) quaternions) may be stored in a buffer on the image capture device 1002.

At step 1008 of the method 1000, the image capture device 1002 performs an in-camera stabilization. In one embodiment, the in-camera stabilization includes estimating the apparent motion of the un-stable image content based on the camera orientation information (e.g., the CORI quaternions) and, in some cases, the image content itself. The image capture device 1002 attempts to counteract the apparent motion of the image content attributed to the camera orientation (without adversely affecting the true subject motion of the image content).

In one exemplary embodiment, the estimated motion represents the motion between two separate image captures attributed to the camera orientation information (e.g., the CORI quaternions). In some cases, true subject motion may also be estimated between subjects in the image content. Counteracting the estimated motion with a relative image orientation (e.g., an image orientation (IORI) quaternion) results in a smoothed trajectory.

In one exemplary embodiment, the in-camera stabilization includes smoothing operations that calculate the trajectories of features in an image (the apparent motion) and apply Gaussian smoothing, L1-norm optimization, or various other techniques understood by those of ordinary skill in the relevant art. The image capture device 1002 may then perform digital zooming, image warping, and/or other image manipulations to remove large translations and/or rotations between the captured images based on the orientation information derived from sensors and/or estimated motion.

Digital zooming, image warping, and other image manipulation techniques broadly encompass transformations of a first image (or portions of the first image) to a second image (or portions of the second image) by mapping pixels in the first image to the second image. In some cases, interpolation and/or extrapolation may be used when pixels are stretched, or where the adjacent placement of pixels in the first image maps to non-adjacent pixels in the second image. Artisans of ordinary skill in the related arts given the contents of the present disclosure will readily appreciate that transformations may be one-to-one, many-to-one, one-to-many, or many-to-many. As described throughout, such transformations may be used to e.g., compensate for the estimated apparent motion of the image capture device to stabilize its resulting images.

While the foregoing discussion is presented in the context of a "camera orientation" (e.g., represented by the CORI), the various embodiments described herein broadly calculate, determine, or otherwise estimate a "captured trajectory" of the image capture device 1002 during a capture duration. The captured trajectory may refer to the physical paths and/or progressions of movement of the image capture device 1002 during the capture duration. The captured trajectory may reflect positions of the image capture device 1002 at different moments within the capture duration. The positions of the image capture device 1002 may include rotations about one or more axis of image capture device 1002 and/or translational displacements of the image capture device 1002.

Additionally, while the foregoing discussion has described an "image orientation" (e.g., represented by the IORI) to counteract the captured trajectory (e.g., represented by the CORI), the embodiments described herein stabilize the captured trajectory of the image capture device 1002 with a corresponding "designated trajectory." As used herein, the "designated trajectory" may refer to the paths and/or progressions to be used in generating the stabilized video (e.g., the designated views). The designated trajectory may reflect actual and/or virtual positions of the image capture device 1002 at different moments within the capture duration. An actual position may refer to a position that was taken by image capture device 1002. A virtual position may refer to an offset (rotationally and/or translationally) from the actual position of image capture device 1002. In one exemplary embodiment, the designated trajectory based on a relative difference from the captured trajectory (e.g., the IORI is described relative to the CORI); alternatively, both the captured trajectory and the designated trajectory could be absolute trajectories (without reference to other trajectories). Still other implementations may treat both captured and designated trajectories as relative to another trajectory (for example, a camera's captured and designated trajectory could be relative to a user, vehicle/drone, etc.)

In one exemplary embodiment, in-camera EIS counteracts changes in the captured trajectory (e.g., CORI) to generate the designated trajectory (e.g., IORI). In one specific implementation, a low-pass filter may be applied to the captured trajectory to smooth out the abrupt rotational and/or translational changes in the positions/motions of image capture device 1002. These adjustments are represented with the designated trajectory. As a practical matter, the low-pass filter may reduce the apparent amplitudes and/or frequencies of motion by e.g., starting apparent motion earlier, reducing the amplitudes of the apparent motion, and/or allowing the apparent motion to continue after physical motion has stopped. Modifications can occur in rotational movements (yaw, pitch and roll) as well as translational displacements (Cartesian coordinate space, x, y, and z.)

In one embodiment, the designated trajectory (e.g., IORI) determines which portions of the captured images (e.g., the designated views) may be used to generate a video. That is, the designated trajectory determines how the designated view may be oriented with respect to the originally captured un-stabilized image content. In one exemplary embodiment, the designated trajectory determines the size and shape of the designated view (e.g., digital zoom or warping), the rotation of the designated view, and/or vertical/horizontal positioning. For example, the IORI determines the relative portion, rotation, and placement of pixels within a 2880× 2880 image capture that are used to generate a 1920×1080 frame of EIS video.

As previously alluded to, the image capture device 1002 cannot perfectly know the future at the time of capture however future trajectories may be estimated based on previous trajectories and/or any buffered un-stabilized images. In one exemplary embodiment, the designated trajectory of a current image may be selected with respect to the captured trajectory at a particular timestamp such that the resulting designated view smoothly transitions with respect to the previous designated view (the previous image) and the next buffered un-stabilized image (the next image). As previously noted, the image buffer may only be able to store a few seconds of images before it fills up and loops back to overwrite itself. Notably, the image buffer look ahead for in-camera EIS is transient and much shorter than the camera-aware post-processing look ahead (which can freely span the entire capture duration, or a portion thereof).

In slightly more detail, the image buffer "look ahead" for in-camera EIS may be limited based on the real-time budget, buffer size, etc. of the image capture device 1002. The next image (or several next images that were captured and buffered after the current image) can be useful to determine a designated trajectory that preserves a user's intended motion (or estimated intended motion) for the image capture device 1002. The user's "intended trajectory" may refer to the paths and/or progressions the user planned/meant to carry out (e.g., panning the image capture device 1002, tracking a moving target).

The intended trajectory may be analyzed to determine whether the current position(s)/motion(s) of the image capture device 1002 is an intended motion or an unintended motion (e.g., shaking due to vibration, rotation due to bumping/mishandling image capture device 1002). For example, when determining the designated trajectory for a particular moment in time (e.g., corresponding to the 1000th video frame) within the capture duration, the position(s)/motion(s) of image capture device 1002 for a duration subsequent to the moment (e.g., corresponding to the next 30 video frames) may be analyzed to determine whether the current position(s)/motion(s) was intended or not. In some implementations, the intended trajectory of image capture device 1002 may be determined based on one or more prior portions of the captured trajectory. In other words, the previous position(s)/motion(s) of the image capture device 1002 may supply context for the intended motion.

Still other techniques and optimizations for Electronic Image Stabilization (EIS) may be used and/or extended by the present disclosure. As but one such example, some variants may constrain the designated trajectory to provide smooth apparent motion as a function of time derivatives. Mathematically, the smoothing function may minimize the magnitudes of a first time derivative, a second time derivative, and/or other time derivative(s) of the yaw angle position, pitch angle position, and/or roll angle position given by the following expression:

$$\min \left( \left\| \frac{d}{dt}\theta \right\|^2 + \left\| \frac{d^2}{dt^2}\theta \right\|^2 + \ldots \right)$$

The foregoing discussion has been presented in the context of in-camera EIS based on sensor data, however the techniques described herein may be used within other EIS implementations, including e.g., optical flow-based EIS correction in-camera. For example, a captured trajectory (e.g., CORI) of the image capture device could be determined by image capture device 1002 based on a history of images stored in memory. As a brief aside, camera motion can be optically characterized based on ideal perspective shifts. For example, camera rotations and translations can be inferred based on the average image rotation, translation and/or zoom and warp. Once the average camera motion is determined, a designated trajectory (e.g., IORI) and relative subject motion can be calculated and represented as point-by-point differences relative to the captured trajectory.

Various embodiments described herein "stabilize" or "counteract" the motion of the device by generating the illusion of apparent stability from selected portions of the un-stable image content, based on the captured trajectory and the designated trajectory. While the embodiments described herein are focused on stabilization, artisans of ordinary skill in the related arts given the contents of the present disclosure will readily appreciate that a variety of other aesthetic effects may also be achieved based on the selection scheme. For example, a de-stabilized view can be achieved by adding apparent motion (e.g., wider rotations, larger translations, amplified/attenuated zooms and/or warps, etc.) Such effects may include artistic effects such as e.g., whip pans, dolly pans, perspective shifts, dolly zooms, etc.

At step 1010 of the method 1000, the image capture device 1002 stores image orientation data corresponding to the designated trajectory. In one exemplary embodiment, the camera orientation and image orientation data (CORI, IORI) may be stored together in the memory of image capture device 1002. In other implementations, the camera orientation and image orientation data (CORI, IORI) may be stored separately in the memory of image capture device 1002.

It is appreciated that the aforementioned trajectories (captured trajectory, designated trajectory, and/or intended trajectory) may be described with scalar values (or displacements), as well as vectors (or velocities), and/or derivatives (or accelerations). In other words, any discrete or continuous representation of paths and/or progressions may be used with equal success. As but one such example, an image capture device 1002 may describe a continuous range of motion (a continuous trajectory) during the capture duration based on a continuous waveform. Other examples of representations may include e.g., transforms, piecewise functions, etc.

At step 1012 of the method 1000, image capture device 1002 encodes the stabilized video based on the designated views. In some embodiments, the user may be given an option as to whether to encode the video file for immediate consumption (either on image capture device 1002 or another device such as rendering apparatus 1052). In some such variants, output resolution/aspect ratio may be selected by the user. The encoded video may be up- or down-converted, cropped, or have letterboxing/pillarboxing added to meet the selected resolution/aspect ratio.

In one exemplary embodiment, the designated views are encoded into a video track 1014. As shown in FIG. 10, the encoded video 1014 may be transferred to rendering apparatus 1052 either as a standalone file or as a stream (e.g., a MPEG-2 transport stream). Streaming applications deliver media content that is immediately playable, even before all the packets of a media file are received. For example, a camera may capture, encode, and stream a live capture to a user's smart phone for immediate playback. Notably, only packets that have been received in full can be played, and missing packets and/or corrupted packets must be skipped which can result in poor user experience. Most streaming applications require a real-time budget (tasks must complete within definitive time constraints) or near real-time budget (tasks must complete within definitive time constraints once started).

In some embodiments, the sensor data, orientation metadata, and/or stabilization margin may be transferred with the video track 1014. In one such implementation, the in-camera stabilized video is shared as a multi-track MPEG-4 that also provides the stabilization margin areas, sensor data, and/or orientation metadata. In other embodiments, the stabilization margin areas, sensor data, and/or orientation metadata may be provided in a separate file transfer (potentially at a best-effort or similar reduced priority delivery).

Referring now to method 1050, the rendering apparatus 1052 decodes the in-camera stabilized video received from image capture device 1002 (step 1054). In one embodiment, the rendering apparatus 1052 may obtain the video track 1014 for use within a "ready-to-share" application. In one embodiment, the rendering apparatus 1052 may use existing or legacy video players to decode the video track 1014 corresponding to the designated view. In other words, the video player may use commodity software and/or hardware codecs to play the video track 1014. In some variants, the ready-to-share application may ignore or parse through collateral tracks (e.g., the stabilization margin areas, sensor data, and/or orientation metadata tracks). In other embodiments, the collateral tracks may be downloaded only when used in subsequent editing or on a best-effort/low priority basis.

At step 1056 of the method 1050, the rendering apparatus may render the decoded in-camera stabilized video 1014 for display on the rendering apparatus 1052. In legacy embodiments, the decoded video may be rendered and directly displayed. In non-legacy embodiments, the rendering apparatus 1052 may use the collateral tracks to improve rendering and/or provide other effects or benefits. For example, the stabilization margin may be used to create certain reduced rate visual effects. One such common example is the "blurred border" effect (e.g., Gaussian blurred image bars) which is often used when capturing and rendering in different aspect ratios e.g., 9:16 vertical layouts within 16:9 horizontal canvases, etc. Similarly, the sensor data and/or orientation metadata can be used for visualizations during playback, etc. For example, orientation metadata may be used to calculate and overlay a compass north visualization, etc.

While presented in the context of a user's rendering apparatus 1052 retrieving the user's own generated content (video 1014) from the user's own image capture device 1002, the techniques described herein may be broadly applicable to any device that is requesting media content from any other device. For example, a user may share their content with family and friends. Similarly, social network applications may connect people with similar interests and/or activities by automatically propagating user-generated media to others.

Figure 11:
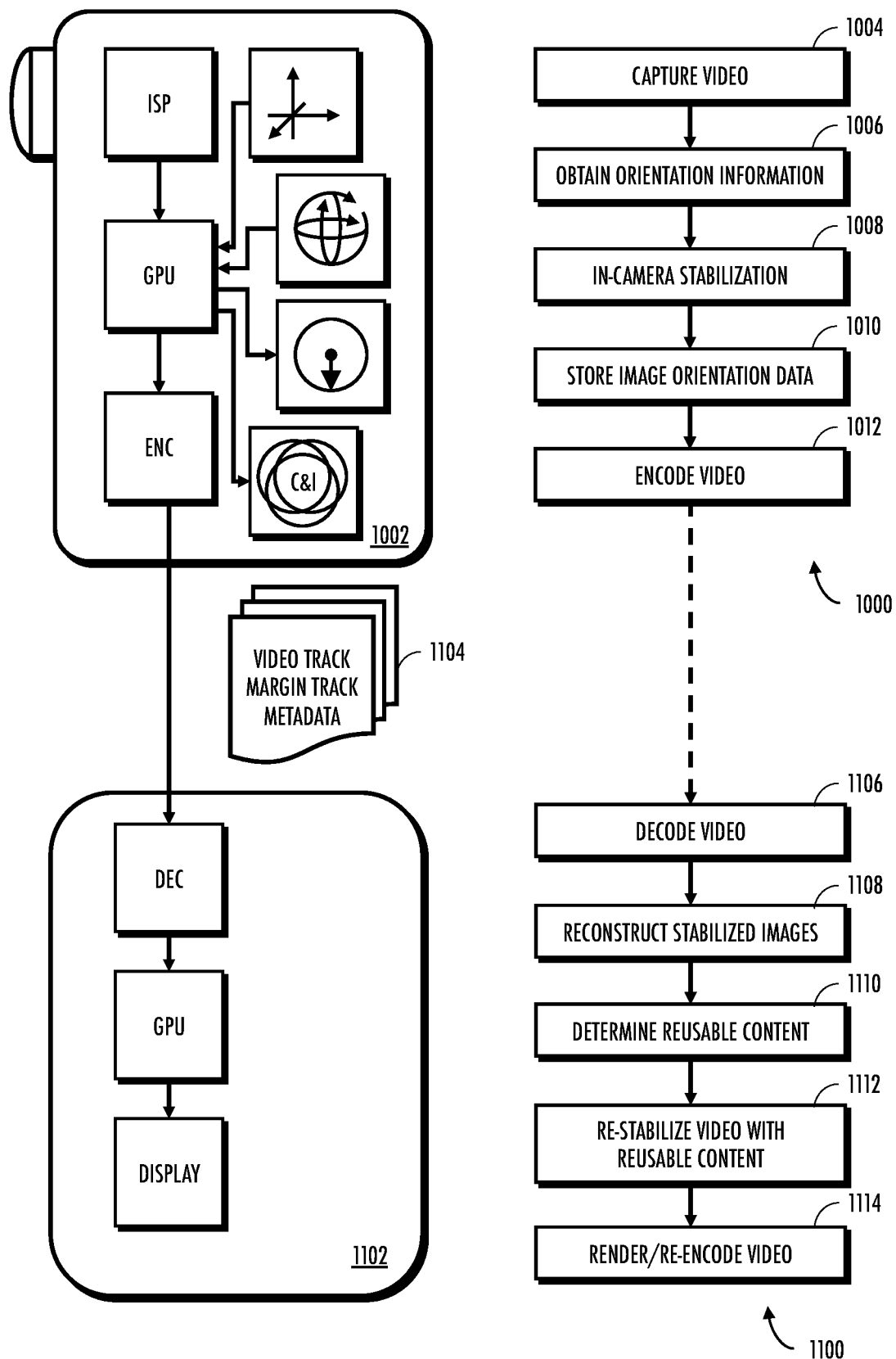
FIG. 11 illustrates logical block diagrams of a generalized method for stabilizing and encoding video and a generalized method for re-stabilizing video, in accordance with various aspects of the present disclosure.

FIG. 11 depicts logical block diagrams of a generalized method 1000 for stabilizing and encoding video (such as was described in FIG. 10 above), and a generalized method 1100 for re-stabilizing video using camera-aware post-processing. In one exemplary embodiment, the generalized method 1000 may be performed, in whole or part, by an image capture device such as image capture device 1002 (or camera 800 depicted in FIG. 8). In an exemplary embodiment, the generalized method 1100 may be performed, in whole or part, by a camera-aware post-processing apparatus such as camera-aware post-processing apparatus 1102 (or camera-aware post-processing apparatus 900 depicted in FIG. 9). Moreover, while the present discussion is described in the context of specific entities, the various functionalities may be combined, divided, merged, or otherwise re-apportioned. For instance, portions of image stabilization may occur in various devices.

As shown in FIG. 11, the output of encoding at step 1012 is a video 1104 that may include multiple tracks e.g., a video track, a margin track, and an orientation metadata track. The video track may include a designated view of stabilized video data. The margin track may include stabilization margin video data (e.g., portions of the original capture video that were cropped out of the frame during in-camera stabilization prior to encoding). The orientation metadata track may include orientation metadata such as sensor data (e.g., accelerometer and gyroscope measurements) and corresponding derived data (e.g., CORI and IORI) including positional and/or rotational data.

At step 1106 of the method 1100, the camera-aware post-processing apparatus 1102 decodes the video 1104. Decoding may include unpacking and/or decompressing a video stream/file of video 1104 into its component parts including a video track, a margin track, and an orientation metadata track. In some cases, the video track, margin track, and/or orientation metadata track may additionally be subdivided into chunks, packets, and/or other sub-divisions. For example, an MPEG-4 track may be subdivided into smaller chunks each of which may be a different type of media and/or metadata (e.g., "ftyp", "mdat", "moov", "pnot", "udta", etc.) Similarly, an MPEG-2 transport stream may be subdivided into fixed duration packets for streaming playback (e.g., vid_t0.ts, vid_t1.ts, vid_tN.ts, etc.)

At step 1108 of the method 1100, the camera-aware post-processing apparatus 1102 reconstructs the sequence of previously stabilized images. Notably, the in-camera EIS stabilized video track may be conceptually understood as a sequence of digitally manipulated portions of the originally captured images (e.g., digitally zoomed, warped, rotated, translated, as described above) having a designated trajectory (e.g., IORI) relative to the captured trajectory (e.g., (CORI). The margin track may be added back to the periphery of the previously stabilized images such that the designated trajectory is preserved throughout the sequence. In other words, unlike a "fixed border video" where camera motion induces an apparent motion, the reconstructed image sequence uses the image orientation to counteract camera motion to induce an "apparent stability"; the result is a sequential set of previously stabilized images characterized by stabilized subject motion and dynamically shifting borders.

In some embodiments, the margin data is manipulated to align with its corresponding designated view. For example, the camera-aware post-processing apparatus 1102 may determine the location of the margin chunks relative to the designated view and extrapolate the corresponding manipulations based on the in-camera stabilization metadata. In other words, if the stabilized image was warped, then the margin chunk may need a matching warp in order to align correctly. The match-warped margin chunk may be placed in the determined location. Matched embodiments preserve the in-camera designated view; e.g., a designated view will maintain a consistent size (e.g., 1920×1080), however the reconstructed stabilized image may vary in size across time.

Alternatively, the capture data may be reconstructed by reversing the image manipulations performed on the designated view. For example, if the designated view was warped, then the warp may be reversed so as to return to its originally captured image data. The un-warped designated view may be placed in the determined location and margin chunks may be added to reconstruct the originally captured image data. Such embodiments preserve the originally captured size; e.g., the reconstructed stabilized image will match the camera sensor size (e.g., 2880×2880).

Artisans of ordinary skill in the related arts given the contents of the present disclosure will readily appreciate that margin data may be decoded, uncompressed, zoomed, warped, rotated, translated, and/or re-projected so as to align at the periphery of its corresponding designated view. In some cases, the manipulations may be performed based on metadata stored within the video track, margin track, and/or metadata track. For example, the margin track may identify the operations that were performed in-camera to create the designated view; responsively, the camera-aware post-processing apparatus 1102 may match or reverse the manipulations so as to reconstruct a cohesive sequence of stabilized images.

As a related consideration, certain types of encoding and/or decoding may introduce visual artifacts. For instance, MPEG-4 encoding is a lossy process, thus the boundary of the designated view may imperfectly correspond to the margin chunks. Consequently, the reconstructed stabilized images may introduce image artifacts at the border between the designated view and the margin chunks. Similar boundary effects may occur at the edges of the reconstructed capture data because the dynamically shifting borders may be inefficiently encoded. In order to minimize such artifacts, additional stitching, smoothing, dithering, and/or blending may be performed.

Some implementations may only reconstruct portions of the sequence of in-camera stabilized images. For example, the camera-aware post-processing apparatus 1102 may be focused on only a short temporal window (e.g., the worst-case frames) or a portion of an image. In such cases, the camera-aware post-processing apparatus 1102 may only reconstruct stabilized images for the window of time, or area of correction. For instance, edge detail may be reconstructed from only the in-camera stabilized video or with only partial portions of the margin information. As another such example, edge/margin information may be estimated using previous/subsequent images of the sequence of in-camera stabilized images and blended with the current image. Reducing the amount of data that is processed during camera-aware post-processing provides benefits both in terms of reduced memory consumption, power usage, and/or processing bandwidth.

At step 1110 of the method 1100, the camera-aware post-processing apparatus 1102 determines which portions of the reconstructed stabilized images can be reused. In some embodiments, the camera-aware post-processing apparatus 1102 may also determine portions of the reconstructed stabilized images that should be ignored (due to errors, etc.), re-processed, newly created, and/or modified. More broadly, the camera-aware post-processing apparatus 1102 can determine what (if any) benefit additional processing would confer over the previously processed data.

As used herein, the term "reuse" refers to data, derivations, transformations, and/or calculations, that generated by a first logical entity that can be processed without substantial modification by another logical entity. In contrast, the term "unusable" refers to data, derivations, transformations, and/ or calculations, that were generated by a first logical entity which are not/cannot be used by a subsequent logical entity. For example, an action camera may attempt a first pass of in-camera EIS stabilization; subsequently thereafter, a camera-aware post-processor may attempt a second pass of optical flow-based EIS stabilization. Because the first pass had stabilization errors, certain portions of the action camera's in-camera stabilization are unusable for the camera-aware post-processor and must be redone. More generally, the techniques described herein are broadly applicable to any form of staged processing, where data that is created by a first pass process may be reused by a second (or subsequent) pass process. Notably, the first logical entity and the second logical entity may be a single physical entity performing different logical processing tasks; alternatively, each logical entity may include multiple physical entities performing subtasks of the same logical process.

In one embodiment, the portions of the reconstructed stabilized images may correspond to the margin data for a stabilized image. For example, the camera-aware post-processing apparatus 1102 may determine that the previous in-camera stabilization was overly/underly aggressive; in such cases, a new designated view size can be selected to use more/less of the reconstructed stabilized images (relative to the designated view used in-camera). For example, in-camera stabilization may have failed because very large swings in camera motion could not be stabilized with the available margin; to provide better stabilization results, a new designated view may be selected to use less of the reconstructed stabilized images. In contrast, relatively stable captures may be able to recover significantly more image content—the excess margin may be used to provide a broader more expansive view, or may enable post-processing editorial effects (e.g., pans, zooms, etc.)

In some embodiments, the reusable/unusable portions of the reconstructed stabilized images may be entire frames of image and/or sensor data. Notably, existing in-camera EIS and optical flow-based EIS techniques often produce very similar stabilization results; as a practical matter, camera-aware post-processing is unlikely to significantly change the captured trajectory and/or designated trajectory (CORI, IORI) for most of the in-camera stabilized video track 1104. However, there may be short portions where in-camera EIS was disabled or unable to successfully complete; in such cases the resulting images may be incorrectly oriented and/or may need entirely new stabilization. Identifying just these portions may greatly simplify post-processing complexity.

In another embodiment, the camera-aware post-processing apparatus 1102 can use its processing resources and best-effort budgets to improve sensor data and/or orientation metadata. In some implementations, the camera-aware post-processing apparatus 1102 may also have access to metrics that were unavailable at capture time (e.g., encoding/decoding metrics, etc.) For example, polynomial fitting and/or reconciliation between different modalities of data (e.g., accelerometer, gyroscope, CORI, IORI, and GRAV, etc.) may be used to identify data that is incomplete, missing, or otherwise suspect. In-camera stabilization that is based on such data may benefit from additional post-processing/re-processing.

In some cases, physical sensors may exhibit "noisy" behavior. For instance, accelerometer and/or gyroscope data values may appear to deviate from expected values (e.g., possibly caused by incorrect debouncing or mis-triggering). Such conditions may be used to identify portions of the reconstructed stabilized images that can be discarded, or that should be re-stabilized. In some cases, discarded accelerometer and/or gyroscope readings may be replaced with polynomial fitting techniques of camera and image orientation (CORI and IORI) for re-stabilization.

At step 1112 of the method 1100, the camera-aware post-processing apparatus 1102 re-stabilizes video with the reusable portions.

In one embodiment, the camera-aware post-processing apparatus 1102 may use the same sensor-based EIS techniques (such as in-camera stabilization described in step 1008 above); in other embodiments, the camera-aware post-processing apparatus 1102 may use other EIS techniques (e.g., optical flow-based EIS, etc.) More generally, any scheme for selecting portions of the sequence of stabilized images, based on the captured trajectory and the updated designated trajectory may be substituted with equal success by artisans of ordinary skill, given the contents of the present disclosure.

In one exemplary optical flow-based embodiment, the camera-aware post-processing apparatus 1102 may use feature detection/motion estimation between the reusable portions of the reconstructed stabilized images. In one such variant, the camera-aware post-processing apparatus 1102 may determine the apparent motion of objects between consecutive reusable portions of the reconstructed stabilized images. In one such implementation, optical flow may be estimated by tracking feature points between the consecutive reusable portions. After the optical flow has been determined, the camera-aware post-processing apparatus 1102 can counteract the apparent motion and perform smoothing based on the modified designated trajectory In one exemplary sensor-based embodiment, the re-stabilized video may use a modified designated trajectory and/or designated view size. The re-stabilized video may be generated from the sequence of stabilized images reconstructed from the video track and metadata tracks (in step 1108). The re-stabilized video may also include data from the stabilized margin track of video 1104 that was not previously encoded in the video track of video 1104.

In one sensor-based variant, the benefit of foresight/hindsight may allow for a smoother designated trajectory based on the sensor data/derived orientation metadata (e.g., the originally measured accelerometer, gyroscope, CORI, IORI, etc.) For example, a camera that was mostly stable during capture may have aggressively minimized its stabilization margins. Due to real-time budget constraints, and image buffer limitations, a subsequent jostle may have created in-camera EIS failures. Since, all video frames are known in post-processing, the camera-aware post-processing apparatus 1102 use a much larger look ahead/look behind window to smooth out the jostle (e.g. 2 seconds, 10 seconds, the full video). A new designated trajectory can be created that prepares for the upcoming jostle (e.g., translational motion ahead of time, zooming out to provide more stabilization margin, etc.), reduces the apparent motion of the jostle, and/or allows for "settling" after the jostle (e.g., translation momentum and zooming back in).

In one such variant, dynamic time warping (DTW) (see FIG. 4 and accompanying discussion) may also be performed on the accelerometer, gyroscope, and/or optical flow data to find similarities between the multiple time series (sensor readings over time). DTW techniques can identify a new warping path and related warping function that offers a better estimation of movement on a frame-by-frame basis. This estimation may also be combined with assisted optical flow using decoder metrics (e.g., motion vectors between blocks in the encoded video file) to further improve motion prediction.

While the foregoing discussion is presented in the context of Electronic Image Stabilization (EIS), the techniques described herein are broadly applicable to any post-processing activity including human assisted/controlled editing. Unlike traditional photography, action cameras are typically designed to capture immersive footage (e.g., live action under a variety of non-stage scenarios). For a variety of reasons, action cameras are typically compact, ruggedized, and designed to require minimal interaction once recording has begun. In most situations, the action camera user cannot control shooting conditions—interesting moments can fleetingly occur and often cannot be replicated. As a result, content generated by action cameras often require significant editing; e.g., raw footage may be incorrectly pointed (e.g., the subject of interest may be outside the designated view) and shots may need to be re-stabilized (e.g., to account for large unexpected movements, etc.)

Camera-aware post-processing may allow a user to select from a variety of EIS stabilization options and/or configurations after capture. For example, after reviewing captured footage, the user may be able to select from e.g., a no stabilization option, an in-camera sensor-based option, a post-processing option (EIS/ERS described above), or an option to add-in additional jitter/shake to a video or video clip. As another example, a user may control stabilization by identifying desired "keyframes" for the resulting video. The camera-aware post-processing may treat the keyframe as a fixed reference that cannot be substantially changed during stabilization (i.e., the designated trajectory must always include the user's keyframes). Still other post-processing and/or editorial tasks may be enabled by the stabilization margin and/or orientation metadata tracks described herein, including without limitation: video editing, cutting out clips, editing colors, sound editing, adding transitions, or changing video speed. The stabilized video may also be compiled into a larger video project or subdivided into smaller segments.

At step 1114 of the method 1100, the camera-aware post-processing apparatus renders video for display and/or re-encodes the post-processed/re-stabilized video. In one embodiment, the encoded file may be a single-track MPEG-4 (video only). In other embodiments, the encoded file may be a multi-track MPEG-4 (e.g., video, margin, and/or orientation tracks). In still other implementations, the stabilization margin data may be discarded, stored in a separate file, or encoded in a separate stabilization margin track.

In some cases, stabilization margin may be re-encoded differently than the stabilization margin of originally encoded in video 1104. For instance, the stabilization margin may be encoded into an archival file (or similar high compression format). In other cases, the stabilization margin may be stored at a different resolution, frame rate, etc. Similarly, the orientation metadata may also be encoded differently, e.g., the camera-aware post-processing apparatus 1102 may also add to the orientation metadata (e.g., updated trajectories, post-processing manipulations, etc.)

In some cases, the video may be encoded and/or transferred to another apparatus for display (such as rendering apparatus 1052) either as a standalone file or as a stream (e.g., a MPEG-2 transport stream) for storage or display. In other situations, the camera-aware post-processing apparatus 1102 may render the re-stabilized video for display. Display may be local to (e.g., an attached display) or remote from camera-aware post-processing apparatus 1102 (e.g., streamed to another device).

While the foregoing disclosure is presented in the context of optical flow-based Electronic Image Stabilization (EIS), artisans of ordinary skill in the related arts will readily appreciate that the principles described herein are broadly applicable to any camera-aware post-processing. Examples of such applications may include without limitation, image editing, video editing, other media editing, etc. As but one such example, a user may use content that is out-of-frame to e.g., synchronize media for in-frame activity (e.g., cueing entrance music for when a subject enters the frame, etc.) Notably, a user can "pull back" from the in-camera stabilized video to see the margin for only the frames of interest (e.g., this can significantly reduce the amount of image data that the user must sift through in post-processing).

Additionally, while most post-processing applications improve visual quality of consumer media, the techniques described herein may be broadly applicable to other applications as well. For example, machine learning and artificial intelligence often relies on feature, object, and/or facial recognition; stabilization reduces apparent motion in images and often can improve accuracy and/or efficiency of such systems. The techniques described herein also enable a first pass of stabilization with the option to reuse some portions of the first pass in a second pass of stabilization. This may be particularly useful for human/machine-based hybrid tasks. Consider, for instance, a self-driving car that uses in-camera EIS for normal operation because onboard sensors are available and can be used in real-time for driving. A collision event may require after-the-fact human analysis using best-effort optical flow-based EIS (e.g., time is not critical but pixel accuracy is important). Other examples of such uses may include e.g., security footage analysis, internet of things, and/or military/industrial automation.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for post-processing video, comprising:
   receiving a video track, an orientation metadata track, and a margin track;
   reconstructing a set of previously stabilized images from the video track and the margin track;
   determining a reusable portion of the set of previously stabilized images based on the orientation metadata track;
   updating the orientation metadata track based on the reusable portion; and
   re-stabilizing the reusable portion based on the updated orientation metadata track to generate a re-stabilized video.

2. The method of claim 1, where updating the orientation metadata track comprises determining at least one of an image orientation, a camera orientation, a gravity vector, an accelerometer value, and a gyroscope value.

3. The method of claim 1, further comprising re-encoding the re-stabilized video; and where the re-stabilized video includes data from the margin track.

4. The method of claim 1, where re-stabilizing the reusable portion comprises cropping the set of previously stabilized images based on the updated orientation metadata track.

5. The method of claim 4, where the reusable portion of the set of previously stabilized images is determined based on an optical flow-based stabilization.

6. The method of claim 5, where the margin track comprises portions of the set of previously stabilized images that were cropped out based on a sensor-based stabilization.

7. The method of claim 1, where the video track, the orientation metadata track, and the margin track are received according to a real-time budget or a near real-time budget.

8. The method of claim 1, where the reusable portion of the set of previously stabilized images is determined with according to a best-effort budget.

9. The method of claim 1, where the orientation metadata track comprises an error flag that indicates an image of the set of previously stabilized images that was incorrectly oriented.

10. The method of claim 9, where updating the orientation metadata track comprises correcting an orientation of the image.

11. An apparatus, comprising:
    a processor; and
    a non-transitory computer-readable medium that stores instructions which when executed by the processor, causes the apparatus to:
    receive a video track, an orientation metadata track, and a margin track;
    reconstruct a set of previously stabilized images from the video track and the margin track;
    determine a reusable portion of the set of previously stabilized images based on the orientation metadata track;
    update the orientation metadata track based on the reusable portion; and
    re-stabilize the reusable portion based on the updated orientation metadata track to generate a re-stabilized video.

12. The apparatus of claim 11, where the instructions, when executed by the processor, cause the apparatus to determine at least one of an image orientation, a camera orientation, a gravity vector, an accelerometer value, and a gyroscope value.

13. The apparatus of claim 11, where the instructions, when executed by the processor, cause the apparatus to re-encode the re-stabilized video, where the re-stabilized video includes data from the margin track.

14. The apparatus of claim 11, where the instructions, when executed by the processor, cause the apparatus to crop the set of previously stabilized images based on the updated orientation metadata track.

15. The apparatus of claim 14, where the reusable portion of the set of previously stabilized images is determined based on an optical flow-based stabilization.

16. The apparatus of claim 15, where the margin track comprises portions of the set of previously stabilized images that were cropped out based on a sensor-based stabilization.

17. The apparatus of claim 11, where the video track, the orientation metadata track, and the margin track are received according to a real-time budget or a near real-time budget.

18. The apparatus of claim 11, where the reusable portion of the set of previously stabilized images is determined according to a best-effort budget.

19. The apparatus of claim 11, where the orientation metadata track comprises an error flag that indicates an image of the set of previously stabilized images that was incorrectly oriented.

20. The apparatus of claim 19, where the instructions, when executed by the processor, cause the apparatus to correct an orientation of the image.

\* \* \* \* \*